W. NICHOLAS AND W. ACKERMAN.
TYPE JUSTIFYING AND COMPOSING MACHINE.
APPLICATION FILED JULY 7, 1914.
1,361,534.
Patented Dec. 7, 1920.
13 SHEETS—SHEET 5.
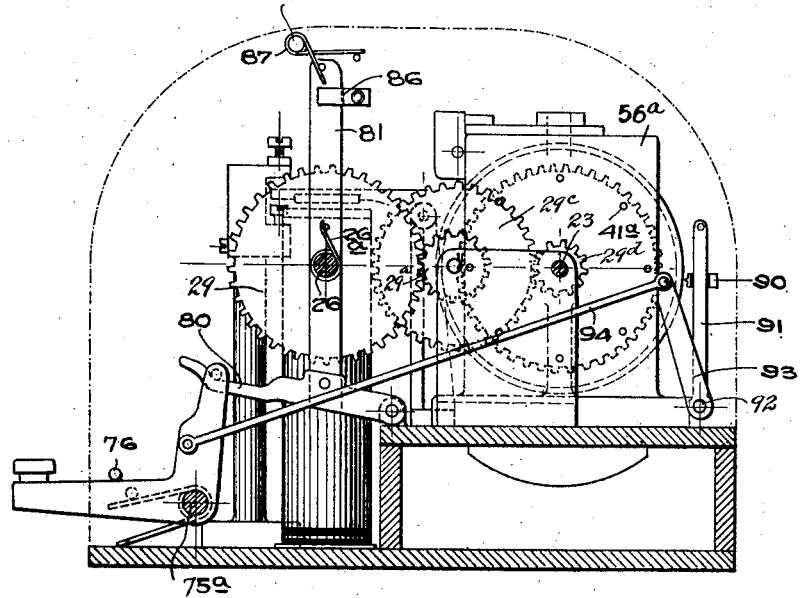
FIG: 9
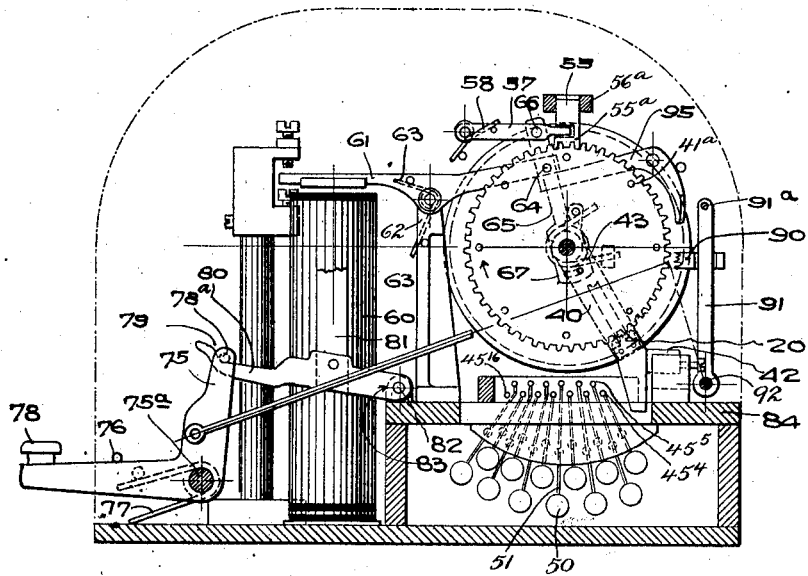
FIG: 10

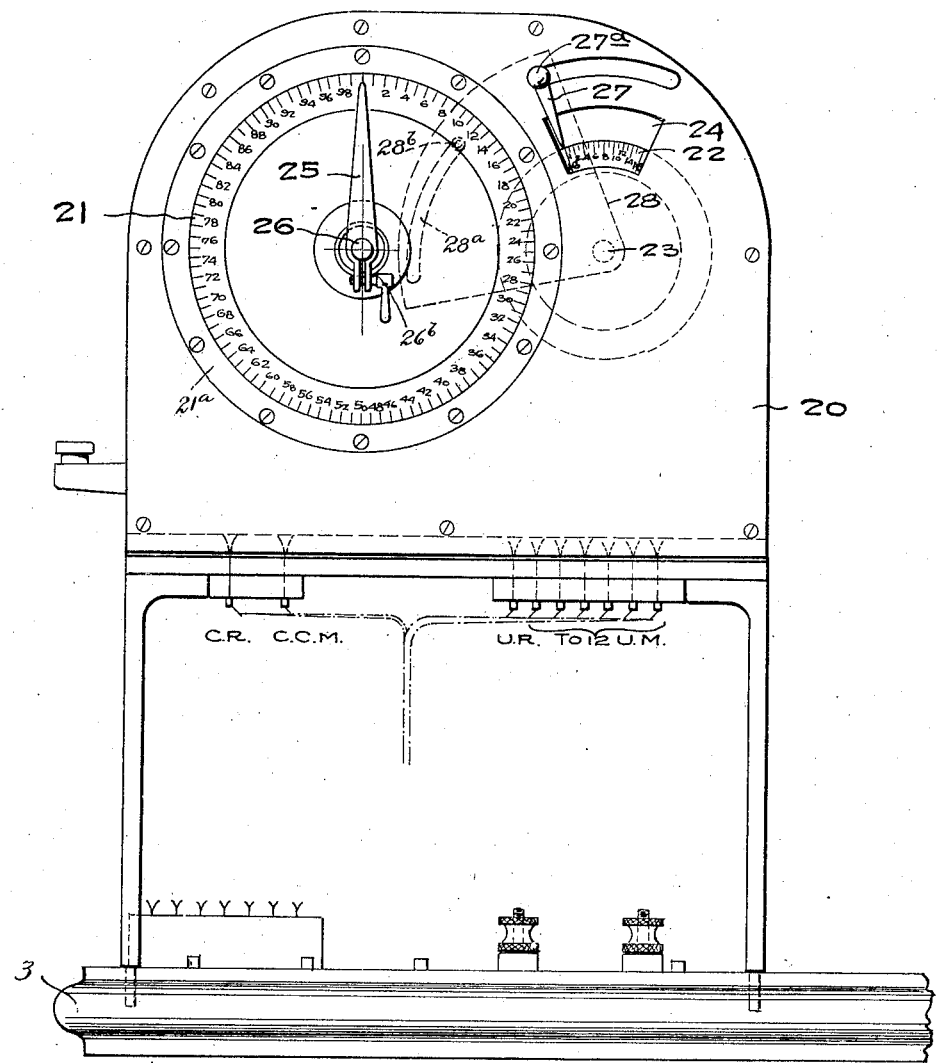

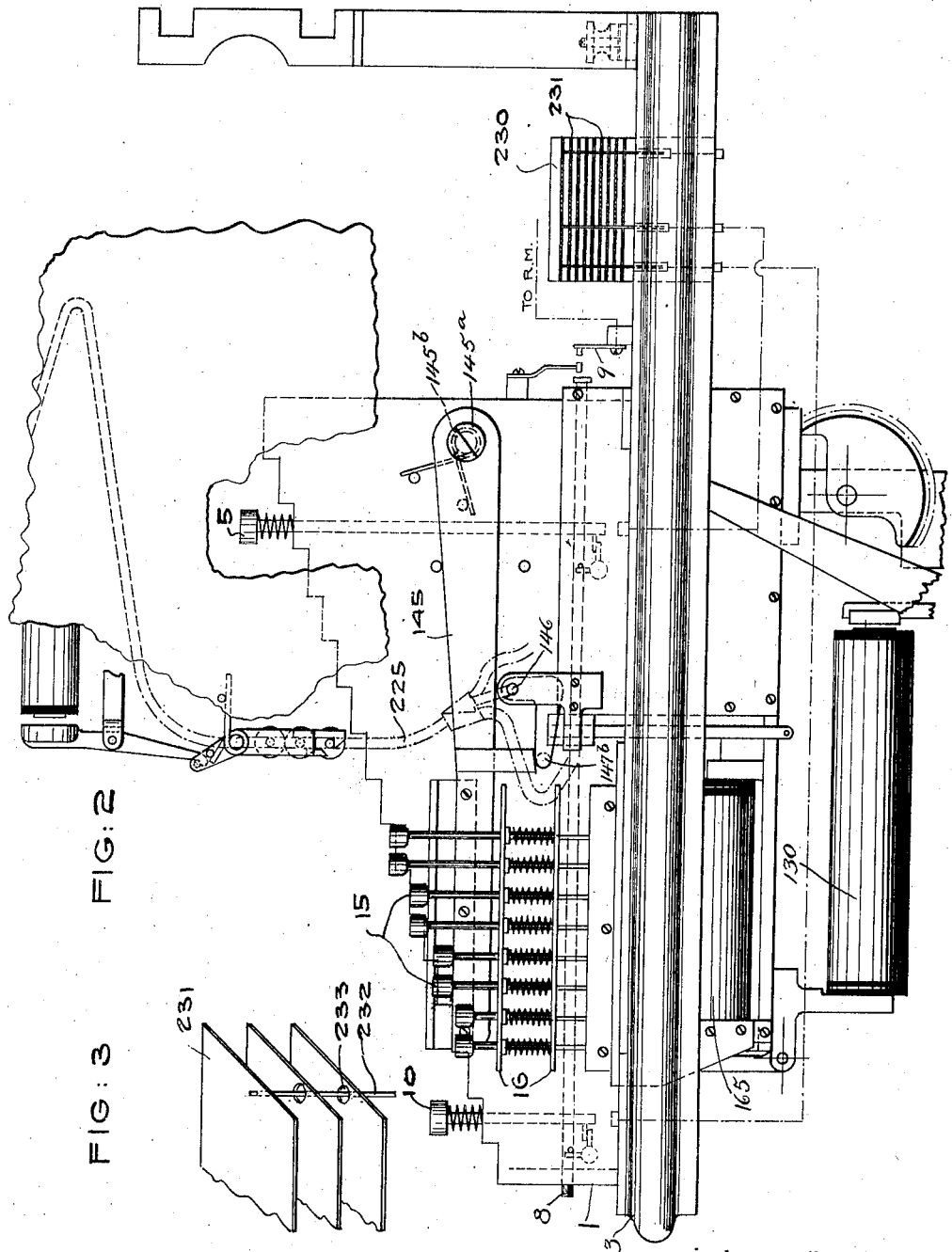

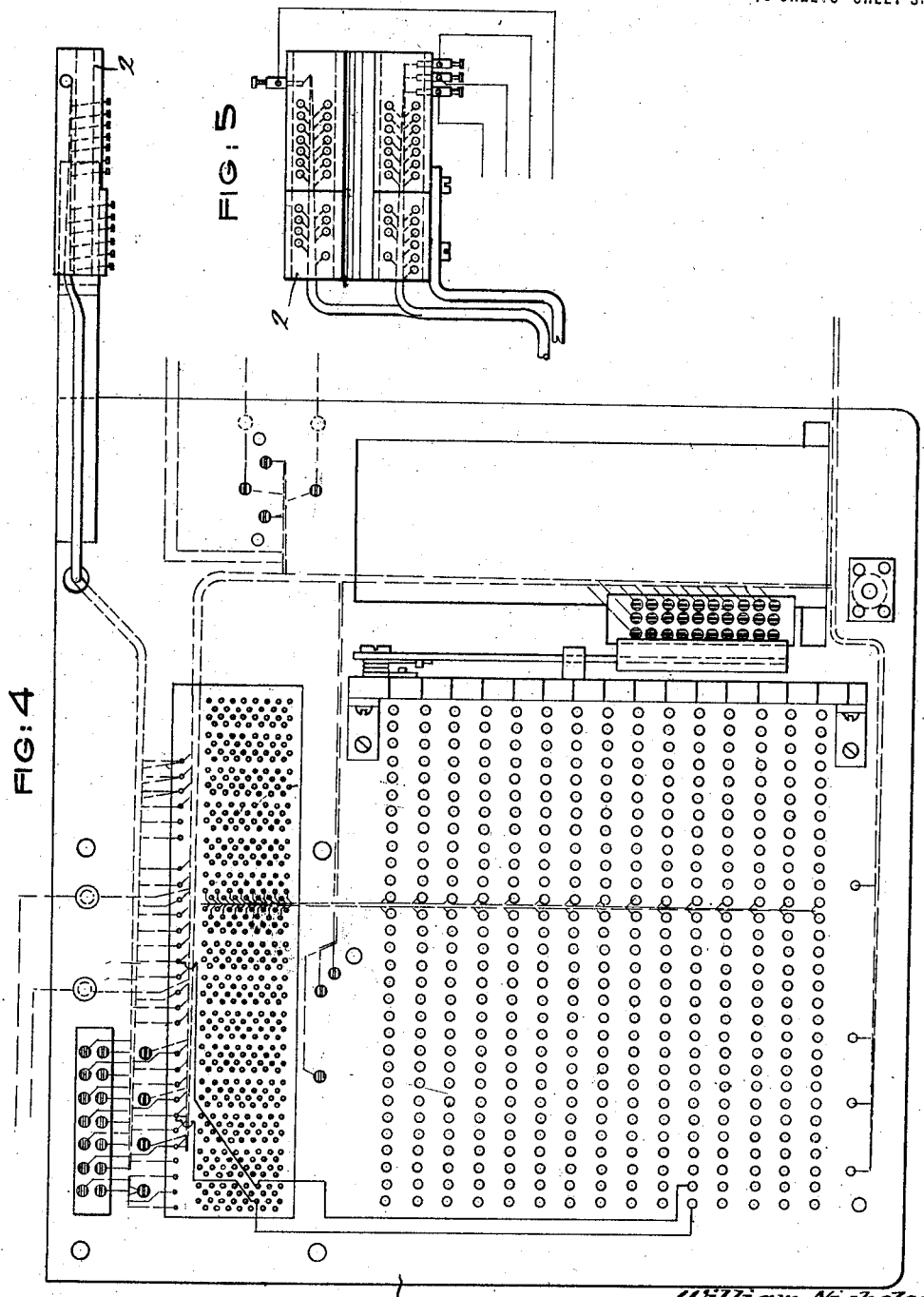

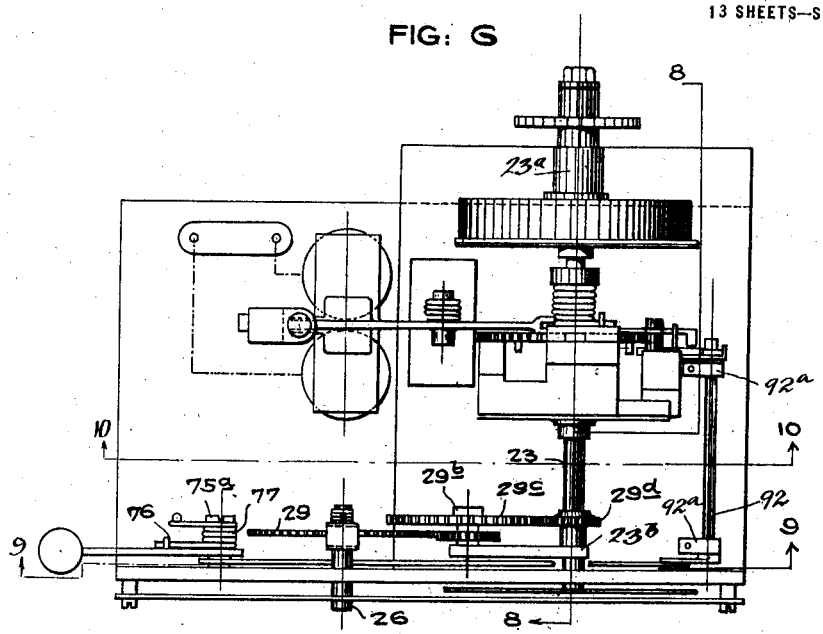
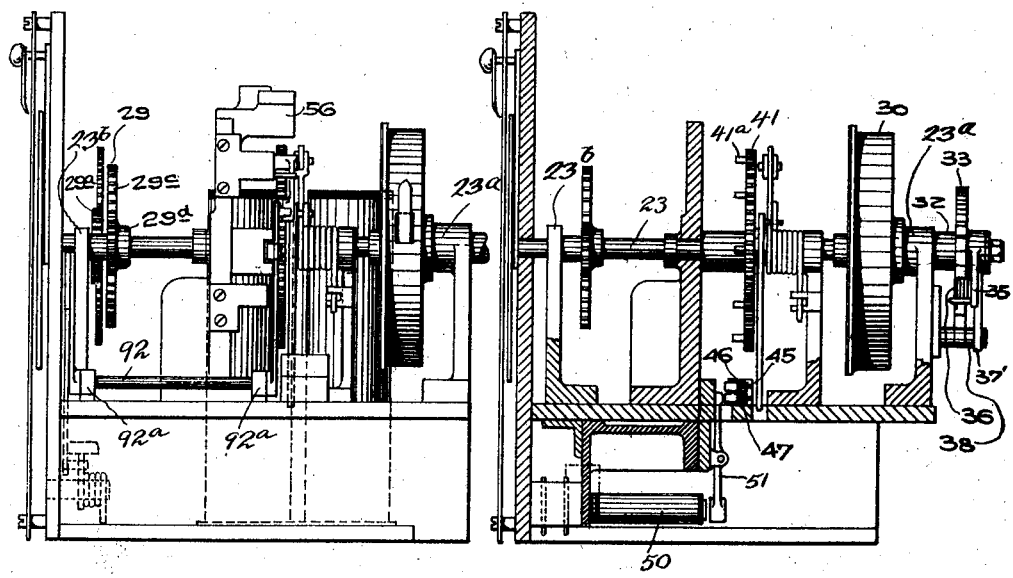

W. NICHOLAS AND W. ACKERMAN.
TYPE JUSTIFYING AND COMPOSING MACHINE.
APPLICATION FILED JULY 7, 1914.
1,361,534.
Patented Dec. 7, 1920.
13 SHEETS—SHEET 6.
FIG: 11
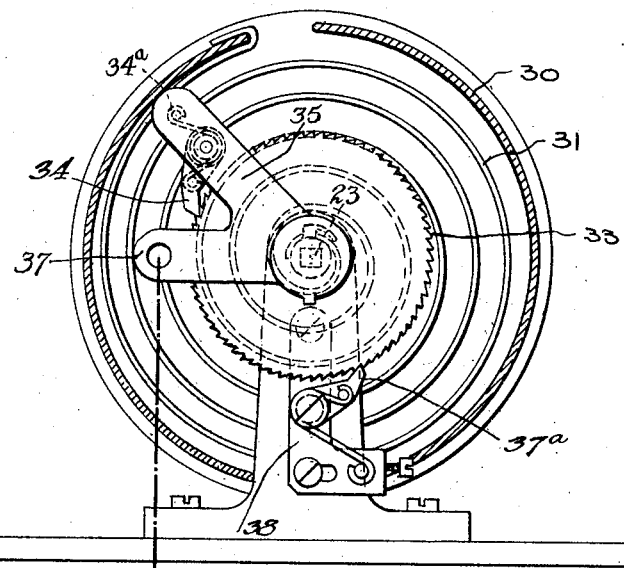
FIG: 12
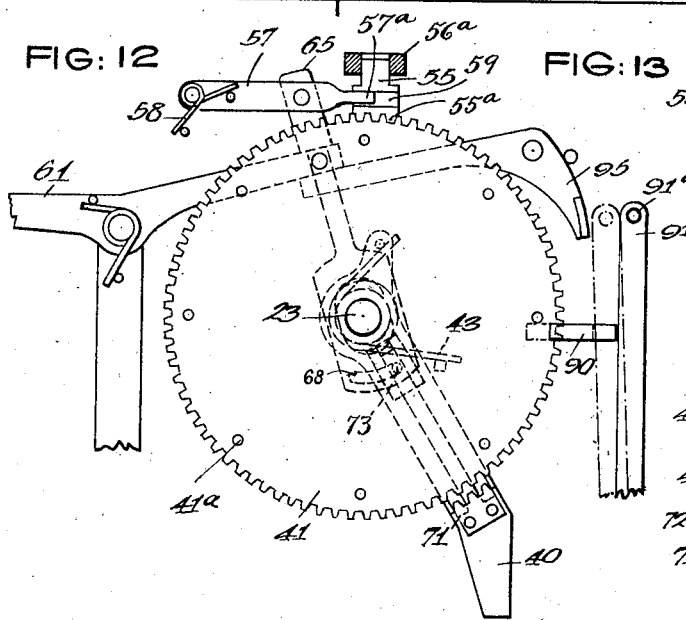
FIG: 13
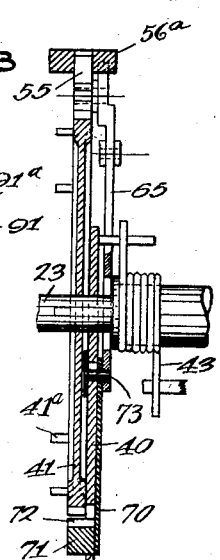
William Nicholas and
William Ackerman
Inventors W. NICHOLAS AND W. ACKERMAN.
TYPE JUSTIFYING AND COMPOSING MACHINE.
APPLICATION FILED JULY 7, 1914.
1,361,534.
Patented Dec. 7, 1920.
13 SHEETS—SHEET 7.
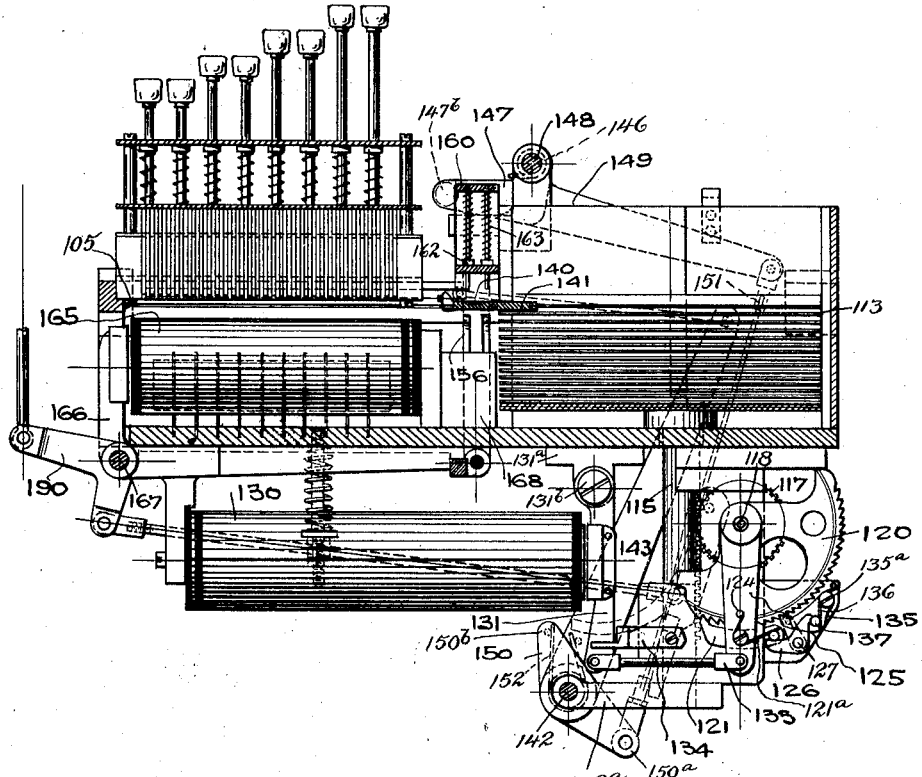
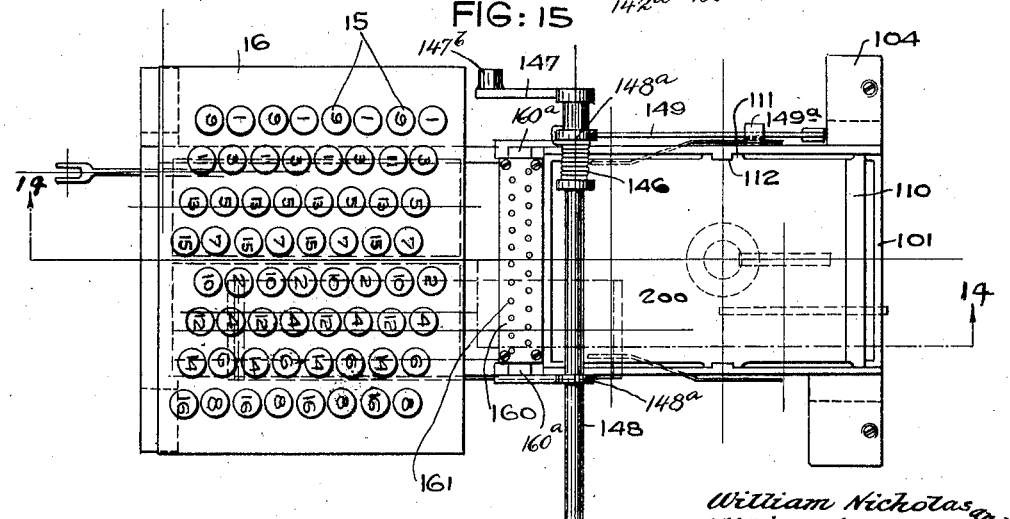

W. NICHOLAS AND W. ACKERMAN.
TYPE JUSTIFYING AND COMPOSING MACHINE.
APPLICATION FILED JULY 7, 1914.
1,361,534.
Patented Dec. 7, 1920.
13 SHEETS—SHEET 8.
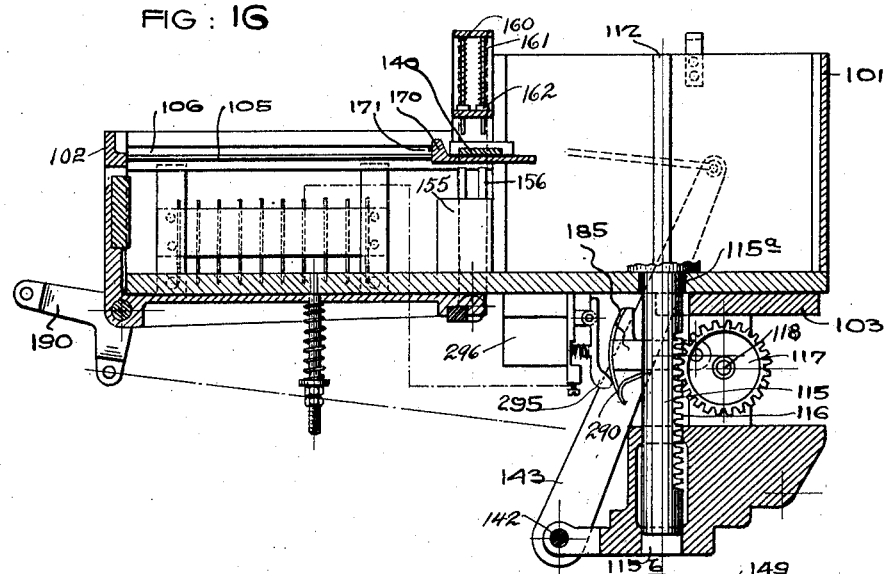
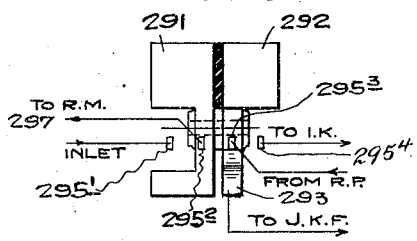
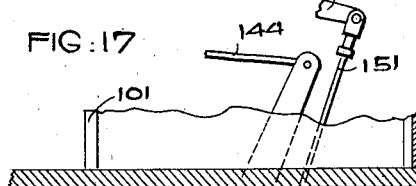
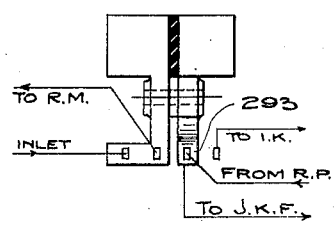
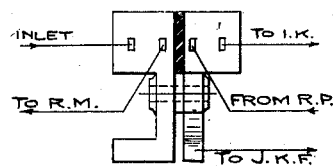
Witnesses:
William Nicholas and
William Ackerman
Inventors
By their Attorney

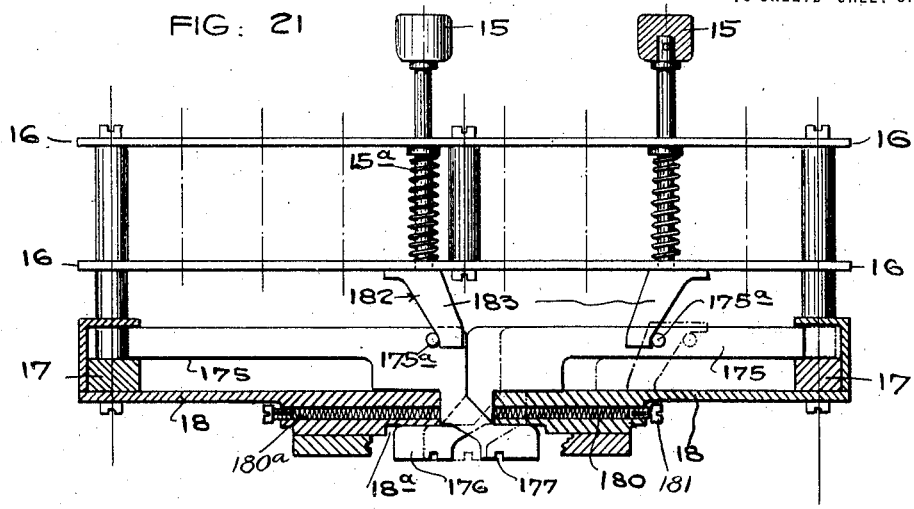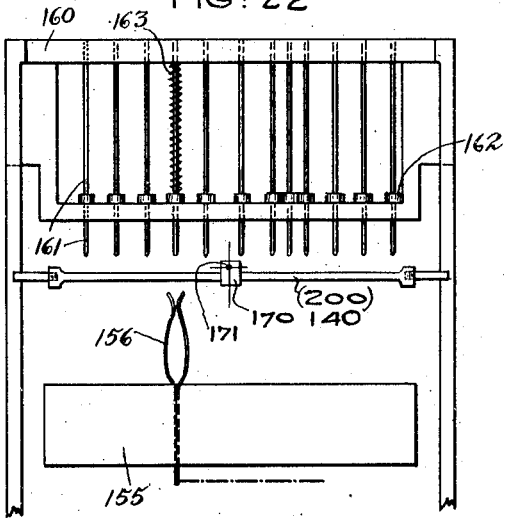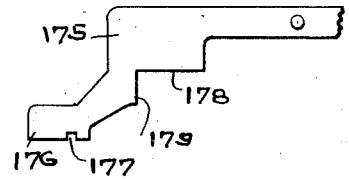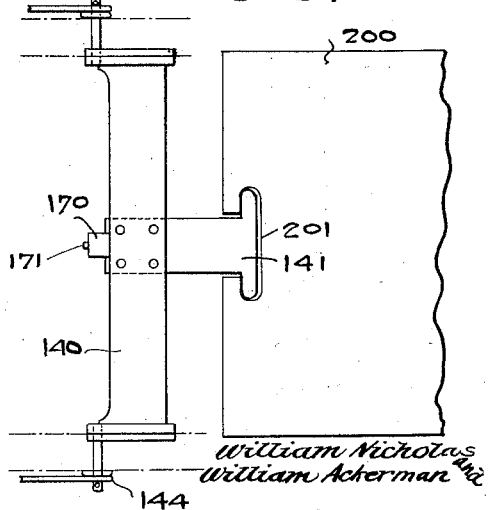

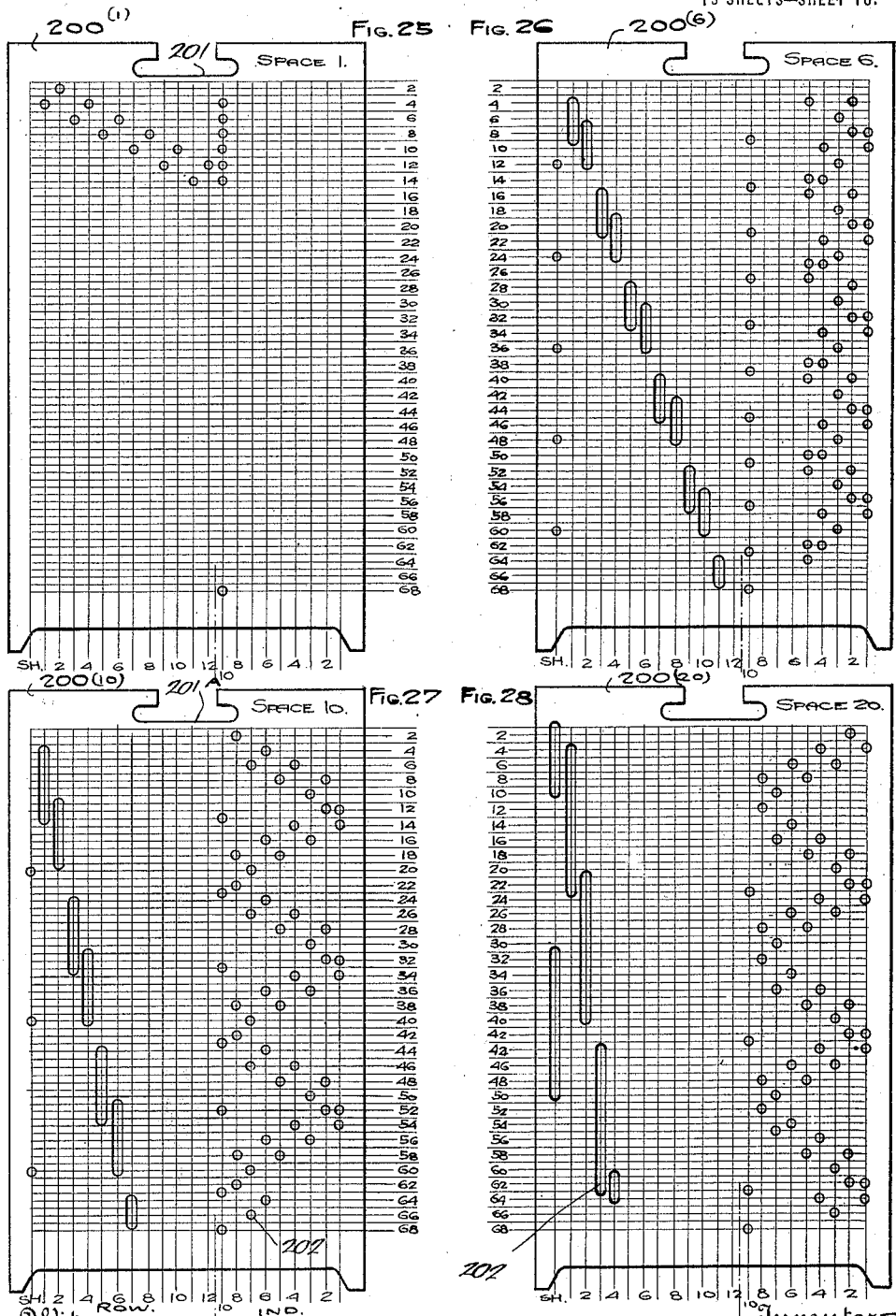

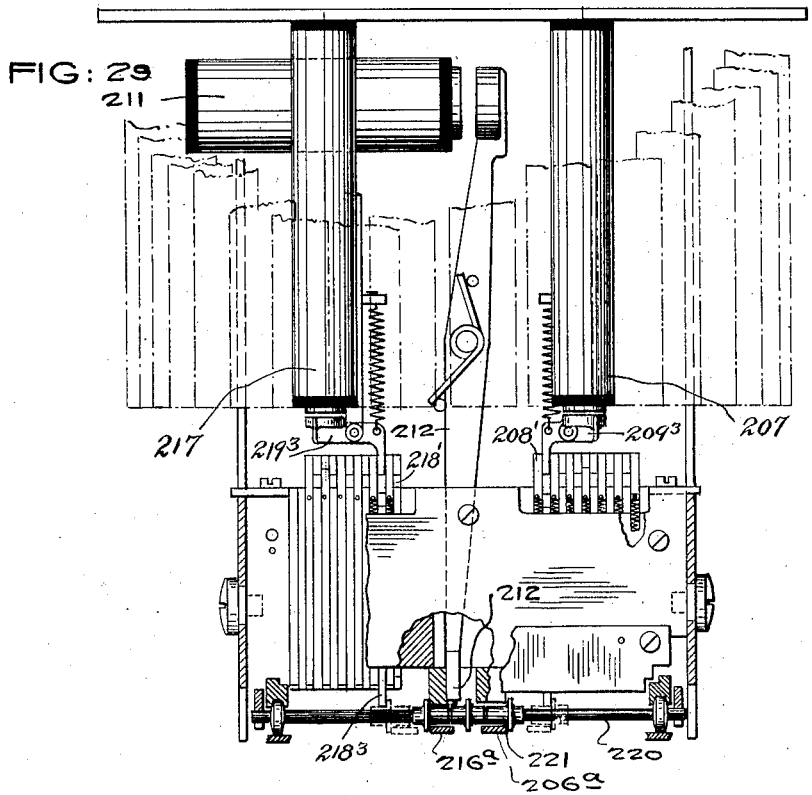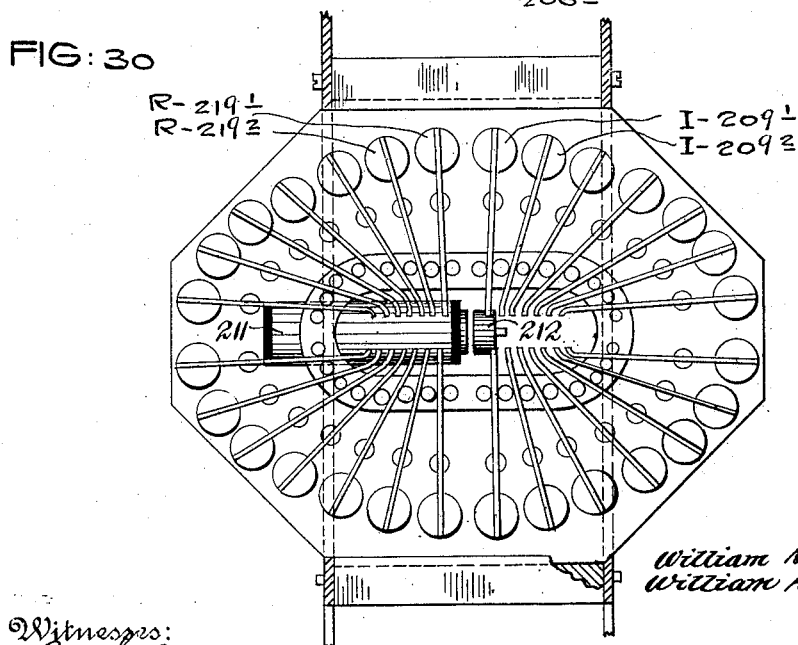

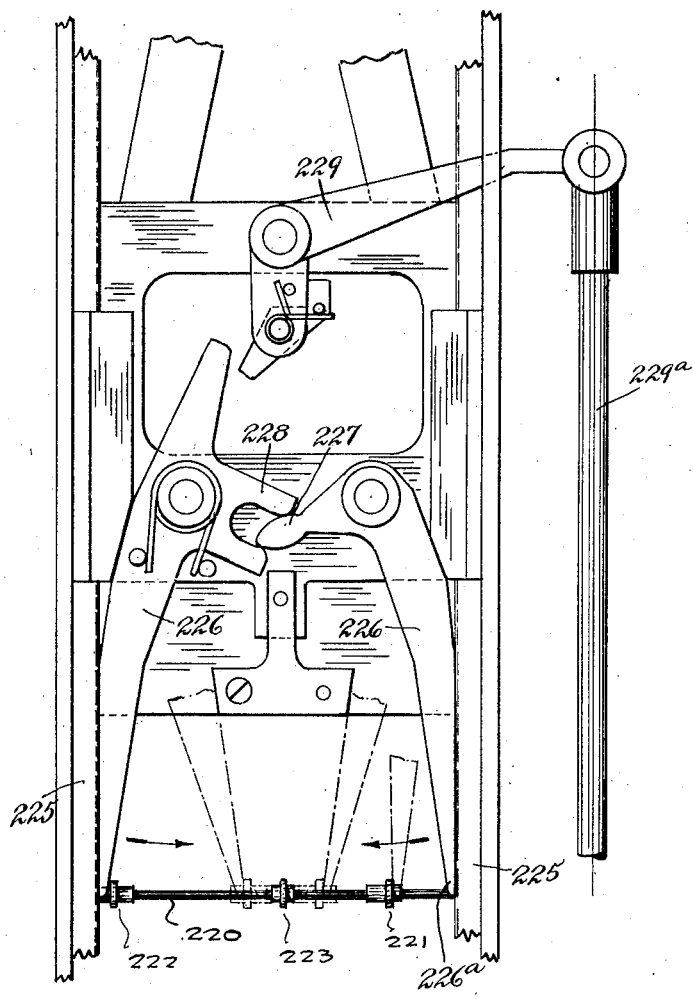

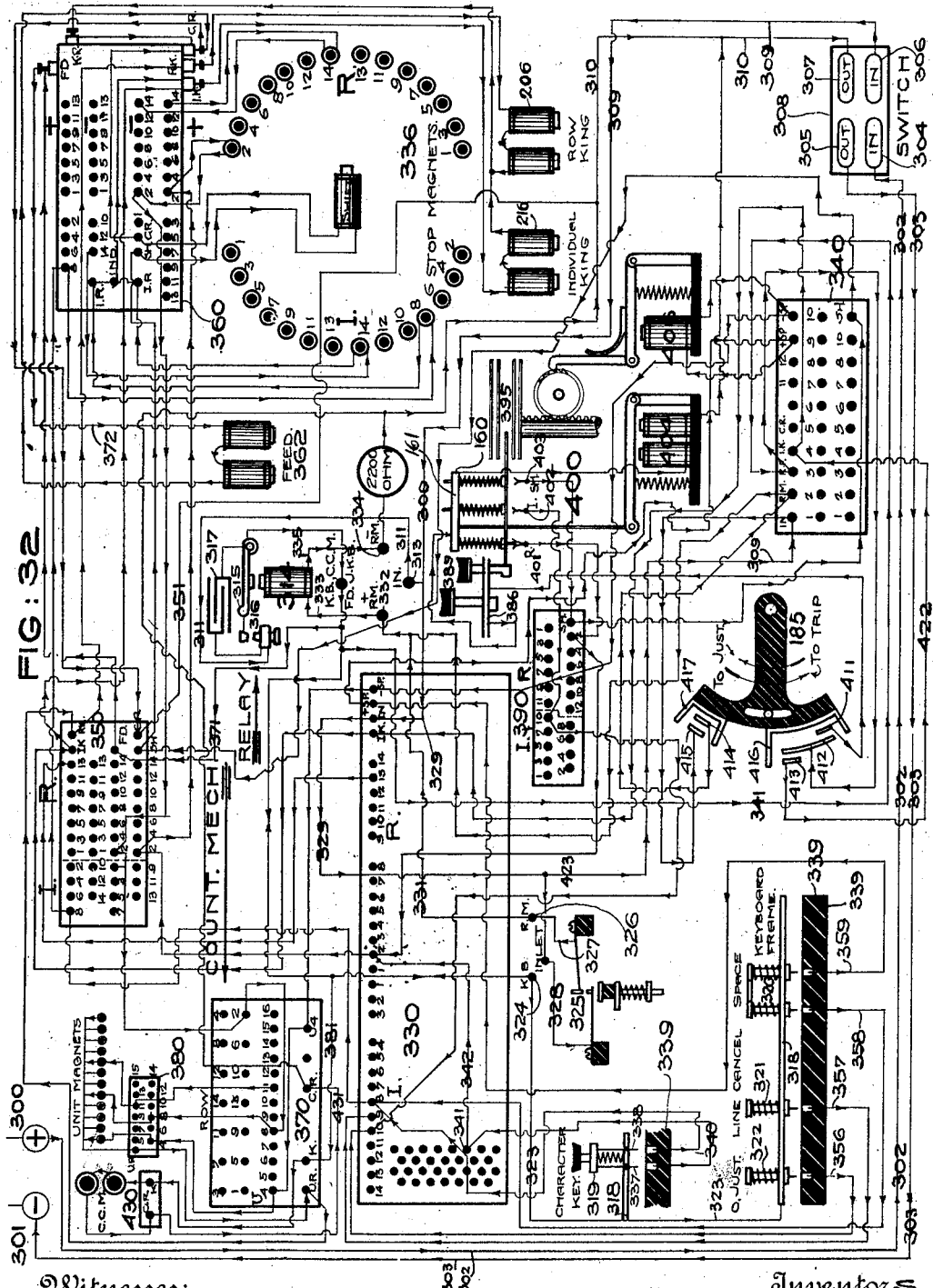

UNITED STATES PATENT OFFICE.

WILLIAM NICHOLAS, OF NEW YORK, AND WILLIAM ACKERMAN, OF LARCHMONT, NEW YORK, ASSIGNORS, BY MESNE ASSIGNMENTS, TO UNITED STATES GRAPHOTYPE COMPANY, A CORPORATION OF NEW YORK.

TYPE JUSTIFYING AND COMPOSING MACHINE.

1,361,534.          Specification of Letters Patent.      Patented Dec. 7, 1920.

Application filed July 7, 1914. Serial No. 849,579.

*To all whom it may concern:*

Be it known that we, WILLIAM NICHOLAS, a subject of the King of Great Britain, residing at No. 222 West Twenty-Third street, in the city of New York, county and State of New York, and WILLIAM ACKERMAN, a citizen of the United States, residing in the village of Larchmont, in the county of Westchester, in said State, have invented new and useful Improvements in Type Justifying and Composing Machines, fully described and represented in the following specification and the accompanying drawings, forming a part of the same.

Our invention relates to type composing machines and more particularly to that class in which a record is made of the set-wise body size of the characters to be composed into justified lines, such record being thereafter employed in reproducing the type and effecting the justification thereof.

In machines of this type, in order to attain to theoretically accurate spacing or justification of the lines composed thereon, the "set" or width of the characters is cast in multiples of a predetermined unit value, and in the present invention we employ the system heretofore adapted by us in connection with Patents #964,677, #964,678 and #964,679, wherein the unit is taken as $\frac{1}{16}$ of an em, that is, substantially $\frac{1}{16}$ of the pointwise dimension of the type body.

Various methods have been employed for registering the accumulated unit measurement of types to be justified into lines of given length, and for making a record in accordance therewith to control the casting mechanism in producing justifying spaces of the required size or sizes. For example in our said Patent No. 964,678, we illustrate a form of record to be used for this purpose, comprising a tape in which perforations are definitely located thereon to select not only the proper character but also to determine the size of both the character types and the justification spaces; while in our said Patent No. 964,679 mechanical selector devices are used to accomplish the same purpose, but in a somewhat different manner. That is to say, in the first mentioned method a plurality of magnets actuate a series of perforating punches and in the latter, movable collars are shifted to symbolic positions determined by stops operated through electric magnets substantially in the same manner as the punches are actuated in preparing the tape record.

Our present invention will therefore be adaptable, with unimportant modifications of minor parts, in preparing either form of record and may accordingly be employed with mechanism for perforating tape to be used in connection with casting machines, or, in setting other kinds of selector devices for the same purpose. Furthermore, in machines of this class indicated, various means have been devised for connecting the individual character and space keys with corresponding mechanisms such as the punches for making the holes in the tape records, and in operating the fingers or levers by means of which the selector devices have been set to that end. In this particular also we wish to point out at the opening of the specification that while we illustrate a form of mechanism applicable to the latter method in which electric circuits are employed in setting the selectors to constitute the controller record, and while various wiring schemes to that end have been illustrated, it is not our intention to limit the application of our device to any one form of record or to any specific means for making either the one or the other of said records.

An object of our invention is, therefore, to provide more efficient and accurate means for registering the unit measurements of character types to be justified into lines.

Another object of this invention is to provide improved mechanism for selecting and controlling mechanism whereby a record may be made to effect the justification of the lines which have been theretofore measured and such measurements registered.

Another object of this invention is to provide mechanical means for setting and controlling electric devices whereby a record is established of the unit size of spaces required to justify lines of type.

A further object of this invention is to provide mechanical means by which the unit value of spaces is recorded by the depression of a key, representing in terms of unit values the aggregate shortage of the line to be justified.

A further object of our invention is to provide mechanical means for recording justification records for lines of type.

Other objects of the invention will appear from the following detailed description of the invention, in connection with the accompanying drawings of which:

Figure 1 is a front view of the unit registering mechanism, and a portion of the keyboard table supporting the register; Fig. 2 is a side elevation of the keyboard; Fig. 3 is a partial view, in perspective showing method of connecting plates in circuit charging switch; Fig. 4 is a plan view of the keyboard layout of electrical connections relating to the justifier mechanism; Fig. 5 is a side view of the switch mechanism shown in Fig. 4; Fig. 6 is a plan view of the registering mechanism with the top casing removed; Fig. 7 is a side elevation of the mechanism shown in Fig. 6; Fig. 8 is a sectional view taken on line 8—8 of Fig. 6; Fig. 9 is a sectional elevation on line 9—9 of Fig. 6, showing mechanism of counter with face plate removed; Fig. 10 is a sectional view upon line 10—10 of Fig. 6; Figs. 11, 12 and 13 are views of details of the connecting slide of the stop lever of the unit register mechanism; Fig. 14 is a sectional side elevation of the justifier mechanism taken on line 14—14 of Fig. 15; Fig. 15 is a plan of the same; Fig. 16 is a median sectional side elevation of the justifier, similar to Fig. 14 with parts omitted; Fig. 17 is a partial sectional view of mechanism shown in Fig. 16; Figs. 18, 19 and 20 are diagrammatic views of the face of the contact segment shown in side view in Figs. 16 and 17 and in three successive positions respectively; Fig. 21 is an enlarged front end view of the justifier keyboard stop actuating mechanism; Fig. 22 is a front view of the justifier multiple contact cross-head showing plurality of yielding electric contact pins; Figs. 23 and 24 are details of mechanism shown in Figs. 21 and 22; Figs. 25, 26, 27 and 28 are selected justifier plates; Fig. 29 is a partial view in plan of the selected setting means; Fig. 30 is a rear elevation of the controller mechanism showing the mechanism employed for restoring the selectors to their original form after having performed their respective functions in the index head of the type casting machine; Fig. 31 is elevation of selector normalizer; and Fig. 32 is a wiring diagram of the electrical connections employed in the present mechanism.

A description of the mechanism employed by us may be conveniently yet more or less arbitrarily, included under three heads, namely, (*a*) registering means, for recording the unit values of characters composing a line to be set; (*b*) justifying mechanism, for automatically determining the unit value of justifying spaces required in the individual lines of such composition; and, incidentally (*c*) the mechanism including electric and other connections, whereby such ascertained unit values are first recorded and then used in casting both the characters and the justifying spaces to compose lines of type.

In order more clearly to understand the construction and operation of the several parts that constitute the embodiment of the mechanism illustrated herein, it is deemed advisable at this point to refer in general terms to those features of the casting machine which are controlled by the record to be prepared by our invention for casting the justified lines.

In type casting machines of the class mentioned, the matrices are arranged in a single plate in parallel rows, having the individual matrices of the several rows disposed in like parallel arrangement in lines at right angles to the rows, so that by shifting the plate in either direction to a position over a common mold in which the body of a single type is cast, the required matrix may be brought into registration therewith, to form the desired character, the "set" of all characters of a given row having the same number of units, four units being the minimum. Two series of stop pins are accordingly provided, at right angles one to the other and conveniently placed in such order that when one of the stops in each series is thrown into engaging relationship with the matrix moving mechanism, a corresponding "row," and a corresponding "individual" matrix in that row, will be brought into position over said mold to cast the desired type, it having been further provided that the type sizing mechanism is simultaneously set to the unit value of the "row" matrix thus selected. In our said patents the particular means described for determining the sizes of the individual type comprises a stepped slide that moves transversely across the path of the sliding or adjustable wall of the type mold and successively presents thereto abutting surfaces at varying depths corresponding to different unit values of the types, so that by arranging another series of stops in proper relationship with means for interposing any given step of the type sizing slide into the path of the mold slide, the latter may be arrested in a position to set the mold to any required unit size, corresponding with the selector "row" of matrices.

The arrangement above referred to wherein the "row" stops of the matrix centering mechanism are operably connected with the type sizing slide, refers to the casting of the character type and spaces composing ordinary lines of composition. In order to cast justifying spaces a further mechanism called the justifier is employed as a part of the casting machine for gaging the mold stops to various unit dimensions for different sizes of space, and, therefore it is the general purpose of our present invention to provide a mechanism for setting the justifier, so called, of the casting machine, which justifier mechanism will presently be reverted to in this connection.

When electric magnets are employed to actuate the various stops, as in the form of machine to which the herein illustrated embodiment of our invention relates, for the purpose of setting the character types, the "row" stop magnets are connected in series with corresponding mold stop magnets which in like manner locate the stepped slide of the said type sizing mechanism, so that when any one of the matrices of a selected "row" is thus located the type body mold will accordingly be set to the proper unit size.

For casting the justifying spaces, however, the mold stops are adapted to be operated by a second set of electromagnets which have their terminals so arranged that the justifier mechanism of the caster may select all of the spaces of the same size, or a given number of one size and the remainder of the next higher or next lower unit value. To this end the mold stop terminals of the justifier mechanism are arranged in two rows side by side in which the terminals of odd and even unit values are set one opposite the other, in connection with which are arranged a series of electro-magnetically operated stops in similar arrangement, which, being in parallel rows with the terminals of the mold stops, are adapted when interposed in the path thereof to locate two separately actuated sliding contact fingers through either of which the current may be conducted into the different mold sizing stops, as required, the one finger conducting the justifier current into one of the even unit mold stop terminals the other into an odd unit terminal thereof. The magnets of the stops which thus locate the contact fingers of the mold-stop-magnet terminals through one of which it has been seen the current must pass to energize the corresponding mold stop magnet and which are called the justifier stops in our said patent, are connected by a series of twelve electric circuits each of which successively connects in series two of the said justifier stops. Or to be more particularly described, the first of said currents has in series stops relating to the terminals of both the four and five unit mold stops, the second circuit likewise connects the five and six unit stops, and in a similar manner the other justifier stops are electrically connected in series in like pairs, excepting the stop corresponding to the 15 units space, which singly is controlled by the 12th or last circuit of the series, the stop for the 16 units and a second stop for the four units each being in normal position of rest for its corresponding contact finger slide and therefore neither is provided with a circuit. Upon closing any one of said twelve circuits which for convenience have been termed justifier "row" circuits, a stop will be interposed in the paths of both of the said sliding contact fingers, thereby closing possible circuits to two mold stop magnets to two sizes of spaces, differing in value by one unit, either of which may be energized to produce the particular space size to which it has thus been set and accordingly that size may be used entirely in the justification of a line, or a given number of either, and the remainder of the other size, by merely shifting the current at the proper time from the one contact finger to the other.

To this end, namely, in order to thus change the circuit from the odd to the even unit mold sizing stop, a circuit changing device is employed having two separately insulated contact surfaces longitudinally disposed in the direction of the travel of a sliding contact connected with the main justifier setting circuit, which as it moves from the one to the other of said longitudinally disposed contacts of the circuit changing device is accordingly electrically connected first to the sliding contact finger of the even units, and then after the predetermined number of even unit space selections the traveling contact passes on to engage the contact that connects to the sliding fingers of the odd unit terminals of the mold sizing mechanism.

The traveling contact has a step by step movement and is designed to move a definite distance, i. e., a given number of steps, one for each space cast and inserted in the line, and therefore to determine the number of even spaces that shall be cast first the circuit changing device is accordingly set at the proper position longitudinally of the path of the traveling contact to effect the change after the given number of insertions of the even unit spaces. This traveling contact is therefore set to an operable position in accordance with the predetermined number of spaces of a given size required by means of the justifier lever, so called, which setting of the justifier lever, is accomplished by first carrying it to the highest possible position against a spring yielding means by the reaction of which the lever is carried into a setting position against that one of a series of justifier lever stops corresponding to the number needed. It has been ascertained that in justifying all lines having from 1 to 20 spaces, of 64 units maximum shortage, where spaces of two different sizes are required to effectuate even spacing not to exceed 9 spaces of either size will be required. Accordingly 9 electric circuits are used and these have their contacts conveniently grouped in the relative position of the individual circuits of the character casting mechanism above mentioned, and which in relation to the circuit closing index mechanism presently to be referred to, will have their circuit closing device located on the "individual" side of the mechanism and will therefore be referred to as "individual" circuits exclusively.

In the normal operation of the traveling contact to change the values of justifying spaces it will therefore operate to cast only spaces of even units to a definite number, which even unit spaces will therefore be the first to be cast in the operation thereof. Hence it has been found necessary to change this order and in certain ascertained cases to insert the odd unit spaces first to a predetermined number and to supply the remainder in even unit values. This is accomplished by introducing a simple circuit changing device operated by an electromagnet which in our said patent is termed the "shift" magnet, requiring but a single electric circuit, called the "shift" circuit to distinguish it from the "row" circuits of the justifier stop magnets on the one hand, and the "individual" circuits of the justifier lever stop magnets, on the other.

It remains to be pointed out in this connection that inasmuch as the justifier is set only once for each line and previous to the commencement of the casting thereof, that the same "row" and "individual" contact positions as used in connection with the casting of the ordinary characters and spaces, may also be similarly employed for the purpose by setting the various justifier stops above referred to. This is accomplished by introducing a slidable switch mechanism operated by means of a cam upon the actuating shaft of the casting mechanism by means of which the switch is operated to carry the contacts pertaining to the respective rows and individuals into position to set the said justifier parts and then to return them to restore the connections for the ordinary casting; and accordingly the circuits which have their terminals at the point or at the level to which this switch is elevated and which operate the various mechanisms of the justifier, are called the "setting circuits," while those which have their terminals at the lower level and connect with the stops employed in the casting of the characters and spaces of regular composition, are likewise termed the "working circuits," and will be hereinafter thus referred to. The "row" matrix stops which in this class of type casting machines are those connected in series with the type sizing stops are actuated simultaneously with the "individual" matrix stops, consequently working circuits corresponding thereto are energized at the same time and therefore the same controller device or selector will make both connections. In like manner different features of the justifier setting mechanism are simultaneously operated so that a single justifier controller or selector makes the contacts to set the mechanism which locates the contact sliding fingers at various type sizing positions and also makes the contacts for setting the justifier lever which it has been seen sets the mechanism to control the slide that determines the number of a given size of space to be inserted in the line. In the justifier setting mechanism of machines of the class to which reference is now being made the justifier lever is controlled by the "individual" positions of the selector while the mold sizing stops are simultaneously controlled by the "row" positions thereof.

In order to energize the working and setting circuits above referred to according to the various combinations required in composing and justifying lines of type a plurality of circuit closing devices are grouped into what is known in the art as the "index head" of the casting machine, which conforms in construction and operation to the particular style of record controller employed. In whatever system adopted the selector "row" and "individual" circuits are adapted to receive current simultaneously, and have their respective contacts arranged in such index head in numerically consecutive "row" and "individual" positions each from 1 to 15 positions, more or less, according to the number of characters cast by the machine; although on the setting side of the switch to which the wires lead from the index head as has been pointed out, not all of the "row" and "individual" positions are required for setting the justifier mechanism.

In the present embodiment of our invention, as already explained, we employ mechanism designed to prepare a controller comprising a succession of selectors with movable members thereon to actuate "row" and "individual" contact levers of the index head in order to close said "row" and "individual" circuits which as has been seen may be either the working circuits employed in casting character type and spaces, or the setting circuits of the justifier such as is disclosed in our Patent #964,679. A controller selector 220 as described in said patent is employed here having upon the shaft thereof collars 221, 222, and 223 either of which may be shifted longitudinally into proper position to engage any one of the corresponding "row" or "individual" circuits.

Therefore to cast a type or space of whatever size theretofore determined by action of the setting circuits two contacts are usually necessary for the working circuits and only two, namely, one to energize both "row" matrix and mold electromagnets in series (for casting spaces the current passing to the mold stop magnets through the justifier or setting circuits) and one to energize an "individual" stop magnet, excepting where the last "row" or last "individual" in any row is called for, in which case the matrix plate is located by a normal, or as it is called, a dead stop, which is always in engaging position with relation to the matrix making parts. Accordingly the contact levers of the index head, not shown in the drawings, are duplicated, one set called the "row" levers grouped at one side, and adapted to be engaged by a collar 221 at the "row" side of the selector, the other or "individual" levers similarly disposed at the other side of the index head and in like manner adapted to engage a corresponding "individual" collar 222. In the mechanism to which our present invention relates as pointed out there are employed respectively 15 "rows" of matrices, 15 "individuals" in each row and that there are fifteen "row," and fifteen "individual" contact levers, and accordingly there are 15 "row" positions on the half of the selector in which the collar at the side may be placed to operate a lever while at the other side 15 "individual" positions are similarly located within range of the levers. In consequence when the collar on the left half of the selector shaft, for example, is carried to any one of the fifteen positions, say the last or fifteenth, it will engage the corresponding 15th "individual" contact lever; and likewise when the collar on the other half of the selector is in the first, second or other "row" position it will similarly engage the "row" lever to energize the corresponding "row" and mold stop magnets. Thus are the character types cast in the order required for composition; it remains briefly to outline the prerequisites for manipulating the same mechanism for casting the justifying spaces.

The space "matrix" in the machine of our said Patent #964,679 is located in the last or fifteenth "row" (and in the eighth individual in said row) and as has been seen no selector collar is required on the space controller to locate that "row" of the matrix plate over the mold; the position "row" fifteen on the controller selector for spaces is therefore available to close a circuit for other purposes and is accordingly employed to make connections for the justifier circuit, so called, which, as pointed out by virtue of the different settings of the justifier parts is used in casting the various sizes of justifying spaces.

Therefore when a space selector follows the selector representing characters composing a word, an "individual" collar thereon displaces an "individual" contact lever to cause the matrix plate to locate the 8th individual over the type mold, and the fifteenth row of the matrix plate will be presented which will then be in position for casting a space of any size. The "row" collar of the space selector being in said fifteenth row position will cause the corresponding row contact levers to turn the current through the justifier circuits whereupon it will set the mold to produce the predetermined size of justify space.

Inasmuch, therefore as the positions of the selectors control the operations of the casting machine, it is the function of our present invention to provide improved means for properly locating the selector collars or tape perforations which not only control the selection of the particular characters required, but also determine the space to be selected.

Two keyboards 1 and 16 are employed in the preparation of the controller by our machine, the one comprising the character keys 5 grouped in 15 rows of 15 each also the space key 10 and certain keys for special purposes which will hereafter be explained, the other keyboard 16 relating to the justifier mechanism proper, having 64 keys 15 one for each possible justification of from 1 to 64 units. The character keys are preferably arranged according to the so-called universal standard keyboard, irrespective of the row or individual arrangement in the matrix plate of the casting and composing mechanisms, a multiple switch mechanism 2, similar to that described in our former patents (see Figs. 3 and 4) being employed whereby it is permitted that the wires of a circuit of any given row or individual stop magnet may be terminated at any convenient position on the keyboard.

Each of the character keys 5, see Fig. 2, with certain exceptions to be noted, has two contact pins, one terminating in a contact point adapted upon its depression to close a circuit having in series the unit "row" mold stop magnets, the other contact similarly connecting with an "individual" stop magnet, a row king, and likewise an individual king magnet being connected in series with each of the corresponding row and individual stop magnets, for setting in operable position the respective "row" and "individual" collars of the controller selectors in the same manner as provided in our former patent referred to above, and which will hereafter be referred to in greater detail. The space key 10 likewise has two stems carrying at their respective lower ends the circuit closing contacts, respectively, one contact making the circuit which includes the eighth individual stop magnet, the other contact connecting in series the space escapement and 4-unit stop magnets, we having constituted the four-unit the minimum size of space to be cast.

As already pointed out, the 15th row and the 15th individual being in the last line on their respective sides of the matrix plate of the casting machine, having fixed stops require no stop actuating circuits and therefore no corresponding row or individual collar will be set for the one or the other, and the character keys that pertain thereto will need have but the one contact; and for like reason the key relating to the fifteenth individual of the 15th row, having no electric contact at all in the type casting machine, a selector collar is not required to control the matrix plate in such position. Furthermore, as has been pointed out, the space matrix blank being located in the 15th row, the contact of the space key is not employed for setting a row stop magnet. It is nevertheless necessary to operate the king row magnet by the space key in order to place the collar for the space selector in the 15th row position, for the uses of the casting machine in casting justifying spaces as explained, which by the closing of the said space bar contact is accordingly done at the same time that it causes to be energized the space escapement magnet 130, Fig. 14, of the justifier device, which it will be seen in connection with the description of that mechanism must operate each time a space is inserted between the words of the line.

The space key and character keys are independently connected with a rod 8 on the depression of each of the said keys, adapted to move longitudinally toward the contact 9 at the back of the keyboard, which in turn is connected with a relay circuit by means of which the various magnet circuits are in turn severally or jointly energized, in a manner presently to be described more in detail. We introduce a current through the keyboard into the individual keys in our present invention in the same manner as that heretofore illustrated, so that as each character key is depressed the current thus let into the key stem will divide and pass through the said contacts, simultaneously operating the "row" and "individual" magnets to which the selected key relates, excepting where one from the 15th individual row is required.

It has been seen that in addition to their function of selecting row and individual magnets, the character and space keys also register the unit values of the particular type which they select. This is accomplished by means of a unit recording mechanism which discloses to the operator at a glance, first, the aggregate number of ems he has set, so that he may know where to close the line and, secondly, the exact number of units required to justify the line, so that he may depress the justifier key 15 which corresponds to such shortage as expressed in terms of units.

The unit register.

We therefore employ a unit register 20 which has upon its face (Figs. 1 and 6 to 13) two dials, a normally stationary dial 21 which has markings representing ems of compositon arranged in a circle adapted to indicate a total of 100 ems of composition for a single line, and a dial 22. An index finger 25 is mounted at the end of a shaft 26 protruding through the front plate of the machine and is adapted to indicate on the dial 21 the total number of ems which have been set in forming a line of composition. At the side of the dial 21 for counting ems is a supplemental rotating dial 22, which has upon the rim thereof successive markings representing a plurality of similar graduations of sixteen units each. Only enough of the dial 22 is visible through the concentric slot 24 to show at its upper side, 16 of said unit graduations the equivalent of one em on the other dial 21. The short shaft 26 upon the end of which is the pointer 25 (see Figs. 1 and 6) is connected by chain gears to the shaft 23 which extends entirely through the unit register mechanism, upon the end of which is fixed the rotating dial 22, so that a positive connection is established between the said unit dial 22 and the pointed finger 25 by means of which is made possible the finer reading of the units that compose the ems of the larger dial.

The main shaft 23 of the unit measuring mechanism which is supported upon the upright brackets 23ª and 23ᵇ, is actuated in the present embodiment of our invention by means of a spring motor 30 comprising the ordinary type of clock spring 31, which is contained within the drum 30, one end of the spring being secured to the shaft 23, the other to said drum (see Fig. 11). The drum is pinned to the sleeve 32 which is loosely mounted upon the said shaft 23 and similarly secured thereon the ratchet wheel 33. A forward motion is imparted to the ratchet by means of a pawl 34 which is pivotally attached to a lever arm 35 and is held upon the periphery of the ratchet wheel by the pressure of a coil spring 34ª. Upon the hub of the lever 35 is an arm 37 which by means of link connection to the driving mechanism as will be explained, is given a rocking motion whereby the ratchet pawl 34 will carry the wheel 33 forward and with it the drum 30, which is the usual manner of winding similar springs and tends to wind or charge the spring motor 30 with each forward impulse of said pawl. A detent 37ª attached to the post 38 retains the ratchet 33 in the position to which it is carried by the pawl 34 by action of the spring in the manner described.

The actuating lever arm 37 is connected directly by yielding means to the driving mechanism of the casting machine when our registering mechanism is operated in connection with such a machine, which will operate to propel the spring winding ratchet 33, until the spring 31 has been raised to an equal tension to an actuating spring of the driving mechanism, thereby enabling the drum 30 to be set by mechanical means. The spring 31 being attached at one end to the shaft 23, when wound to the desired tension supplies the power to rotate the shaft in a given direction until counteracted by other means.

The shaft 23 it will be recalled, is operably connected with the shaft 26 of the pointer 25, and has upon its end the dial 22, to disclose to the operator the number of units set by him, and it will therefore be necessary in order to register the units to limit the rotation of the shaft 23 against the action of the spring 31, in accordance with the unit requirements of the various characters, so that it will always accurately record the units set. Therefore I have provided a stop lever 40 (see Fig. 10) adjacent a gear wheel 41 pinned to said shaft, which extends beyond the periphery of the gear wheel 41, so that as it swings upon the shaft 23 it is adapted to engage any one of the series of stop pins 45 arranged in two parallel rows in a block 46. These pins are adapted to slide longitudinally within suitable bearings in said block, being normally held by means of springs 47, in the position shown in Fig. 8 having their forward ends flush with the surface thereof adjacent the swinging arm 40. A bank of electro-magnets 50 are provided with armature levers 51 pivotally supported midway of their length and adapted when said magnets are successively energized to cause the free end of the respective levers to impinge against corresponding pins 45 forcing them against the action of their springs 47 to project beyond the face of the block 46 into the path of the swinging lever arm 40. The stop lever arm 40 is normally held against an adjustable stop 42 by means of a spring 43, one end of which contacts a pin projecting from an upward extension of the lever 40, the other end of the spring being secured to the middle bracket supporting the shaft 23.

The stop magnets 50 are connected in series with corresponding row stop magnets 207 of the selector setting mechanism hereinafter explained, (see Figs. 29 and 30) after passing through a peculiar layout switch between the respective row and unit stop magnets, whereby the row magnet connections are converted into the proper unit value; it is apparent that the rows as they have been established with reference primarily to the selector locations of the matrix plate, in many given instances will not conform to the successive order in which the unit stops are arranged. The details of the construction of this switch and also that whereby the characters layout is converted into the order of arrangement required for the various "row" and "individual" circuit connections, have been fully described in our said patents and therefore will not be referred to in this except to point out that both of the layout switch blocks are here employed in the same manner and of the same construction as described in said patents. The general scheme of keyboard wiring is therefore also similar to that described in said patents as will be seen by referring to Figs. 2, 3, 4 and 5. The switch block 230 (Figs. 2 and 3) on the keyboard, comprises the insulated parallel plates 231 connected by pins 232 passing through enlarged openings 233 in the plates to which the pins are not electrically connected to conduct the respective current from the keyboard to the proper stop magnets above described.

The operable tension spring which holds the stop lever normally against the fixed stop 42 is of only sufficient strength to maintain that member in such normal position of rest and means are provided next to be described whereby this lever may be operably attached to the gear wheel 41 and by action of that member carried against the appropriate stop pin selected in the course of composition. To this end, therefore, the stop actuating gear wheel 41 has provided a locking means which consists of a longitudinally moving slide 55 with teeth 55$^a$ at its end which lock-slide is held against lateral movement by guide bearings 56$^a$ within a bracket immediately above the periphery thereof and is adapted to mesh with the teeth of said gear upon being forced in the direction thereof. (See Fig. 10.) The slide 55 is moved within its bearings by means of a finger 57 which is pivotally supported upon the extension of the bracket 56 and by means of a spring 58 is normally forced downwardly by having a narrow end 57$^a$ enter a transverse guide slot 59 in the lock slide 55, so that normally by action of the spring 58 the gear lock 55 is held within its lateral guide walls in mesh with the said stop actuating gear 41 thereby securely holding the latter in the position to which it may be advanced. Means are provided for lifting the finger 57 and thereby unlocking the gear wheel 41 when it is required to rotate the same, comprising an electro-magnet which may be termed the counter connecting magnet 60, which has a lever armature 61 pivotally supported substantially midway of its length upon the post or bracket 62 and normally held out of contact with the magnet by means of the spring 63. One end of the spring 63 is against a pin projecting from the bracket 62 and the other end impinges against a pin similarly projecting from the side of the armature lever 61. The opposite end of the armature lever is bifurcated to receive the lifting bar 65 and is connected therewith by the pin 64 in said bar extending laterally through transverse slotted holes in the armature lever. The lifting bar 65 is connected at its upper end to the finger 57 by means of a pin 66, and has its lower end slidably supported upon the shaft 23 adjacent the hub of the stop lever 40 by means of the slotted end 67 thereof bearing on the respective sides of said shaft. Hence, on energizing the magnet 60, the free end of the armature lever 61 is elevated, carrying with it the slotted bar 65, thereby lifting the finger 57 to elevate the lock 55 out of mesh with the gear 41, permitting the latter by action of the spring motor 30 to be carried forward until it is arrested by reason of the stop lever 40, contacting one of the pins 45, which are projected into its path or coming against the dead stop 45¹⁶ at the opposite side of said row of pins. The stop lever 40 in order to perform the motion above described is operably connected with the gear 41, at the same time and by the same means that the lock 55 is raised out of mesh therewith, that is, by reason of a sliding member 70 guided in suitable bearings upon the lever 40, having upon its lower end an offset portion or block 71, which has upon its inner face immediately underlying the periphery of the gear wheel the locking teeth 72 corresponding to those of the gear. The teeth of the offset 71 may therefore be drawn into mesh with the teeth of the wheel 41 upon the sliding bar 70 being elevated sufficiently which is conveniently accomplished by connecting the member 70 at its upper end with the lock-connecting bar 65 which is reciprocally actuated for that purpose by the armature lever 61. The connection between the connecting bar 65 and the sliding bar 70 is made by means of a cam slot 68 in the lower end 67 of the bar 65 which receives a pin 73 projecting from the side of the bar 70 adapted to move circumferentially therein as the member 70 is carried with the stop lever to which it is attached in the manner described, until the latter impinges against one of the stops 45. Hence, as the armature lever 61 elevates the bar 65 it lifts the lock 55 out of mesh with the stop actuating gear 41 and simultaneously brings the toothed end of the sliding member 70 into mesh therewith, so that the gear 65 thus released will be impelled forwardly by action of the spring 31, until the stop lever 40 is brought against the interposed stop 45, whereupon, on deënergizing the magnet 60, the armature lever 61 will immediately be thrown in the opposite direction by action of its spring with the result that the gear wheel is again locked in the position into which it has thus been carried by action of the spring motor 30; and furthermore, at the same time the lock 55 at the upper side of the gear 41 is drawn into mesh therewith thus to hold it until the next setting, the gear and lever connecting member 70 have been simultaneously carried out of mesh at the lower side thereof in order to permit the stop bar 40 to be thrown by action of its springs 43 back to its normal position of rest against the fixed stop 42 until carried forward to connect and record another unit measurement.

It is apparent that the amount of motion that is thus permitted to the shaft 23 will therefore depend, primarily, upon the relative positions of the stops $45^4$ to $45^{16}$ with reference to the respective distances from the lever 40 in its normal or initial position and, secondly, upon the particular stops which shall have been interposed into the path of the radial bar 40; hence, the position of the first pin $45^4$ will mark the minimum registration of 4 units as employed in our present system and likewise the position of each succeeding pin will represent a unit increment, the last position being that of the dead stop $45^{16}$ standing for the 16 unit or maximum registration of the counting device.

The pointer 25 which indicates em registrations on the dial 21 is adjustably secured to a short shaft 26 having its bearing in an upright member 81, which is supported upon a tilting base for a purpose hereinafter to be explained. The shaft 26 is operably connected with the dial actuating shaft 23 by a chain of gears comprising the gear 29 pinned to said shaft 26, the pinion $29^a$ and gear $29^c$ on a sleeve mounted to run loosely upon the stud or shouldered screw $29^b$ and the pinion $29^d$ upon the actuating shaft 23.

The ratio of the rotation of the gear 29 is one sixteenth of that of the actuating shaft 23 and consequently when the former moves to mark an em, the latter will have rotated through 16 times as many degrees, which of course designates the units 16 of which constitute an em.

The dial 22, it has been seen, is graduated in units and in our present form is subdivided into eight equal segmental panels each containing 16 units with corresponding markings from 1 to 16, respectively. It will therefore be necessary to establish the pin 45⁴, the first to be reached by the stop lever arm 40, at that point to which that arm travels while the disk of the dial 22 rotates an amount exactly corresponding to four unit graduations thereon, the minimum registration, and in like manner each of the succeeding pins to 45¹⁶ will be placed to advance the unit dial one unit graduation at each successive stop, the dead stop 45 being in this manner located to carry the dial 22 the full sixteen units extending over one of the eight panels of the dial 22.

The units of a segmental panel of the dial 22 are numbered from 1 to 16 but are arranged in order opposite to the direction of the normal rotation thereof, so that it will always indicate the number of units required to complete a line by means of the relatively fixed pointer 27 which is adjustably attached to the front plate of the register immediately over the dial 22 as seen in Fig. 1.

For the proper reading of the dial 22 in composed lines of even unit lengths the pointer 27 might be dispensed with by making the opening 24 through which the dial is visible, as is done in the present instance, to expose only a sufficient portion thereof to show 16 units so that either edge of said opening supplies a line which may be referred to as designating the number of units registered.

The number thus indicated whether by the pointer or by the form of the opening itself, will therefore show the number of units required to complete the line, which will guide the operator in selecting the proper justification key that relates to exactly the number of units to effect the justification of the line thus indicated. That is to say if more than one em is required for justification of a given line, the total number of even ems will be ascertained by the operator referring to the moving index pointer upon the stationary dial 21, while the fractional part of the em will be shown in unit graduations which comes directly under the pointer 27, which normally stands at either the one side or the other of the opening 24 through which the dial 22 is visible.

As pointed out, when justifying lines having an even number of ems, either side of the opening 24 will perform the function of the pointer 27 inasmuch as the segmental sections of the dial exactly equal in circumferential length the width of the opening 24. If it should be desired, however, to terminate the line at a fractional em point the adjustable feature of the pointer 27 is then brought into use, which for the purpose is mounted upon a radial piece 28 that is pivotally supported upon the shaft 23, so that by means of the handle 27ᵃ projecting outwardly from the pointer 27 that index may be carried from one side of the opening 24 or to any intermediate point thereof, the normal position of the pointer being that shown in Fig. 1 at the left hand side of the opening 24.

It is apparent that by shifting the pointer to the right one or more units, the operator will thereby be shown correctly the number of fractional units required to justify the line.

It has been seen that the normal position of the index 27 must point to the figure 16 indicating an even number of ems, and that when that index is thus indicating the 16th unit of the dial 22 the moving index pointer 25 must likewise point to an even em graduation on the dial 21. It is desirable to maintain such correspondence between the em and unit pointers so that both always point to even em registration or to proportional fractions thereof, and consequently while the pointer 27 is being shifted circumferentially with reference to the dial 22, the pointer 25 should make corresponding progress from the one to the other of the em markings. To this end the simple method is employed of causing the dial 21 to be shifted proportionately as the pointer 27 is moved, and for this purpose a pin 28ᵇ projects from the rear of said dial into a camming slot 28ᵃ into which said pin fits to move longitudinally therein. The camming slot 28 is slightly eccentric in that the radius of its outer end exceeds in length the corresponding radius of its inner end by an amount equaling the distance between the em graduations on the dial 21, the shorter radius designating the end of the slot in which the pin rests while the member 28 is in its normal position shown in Fig. 1. Consequently as the index 27 is moved radially to the right, the dial 21 will be rotated to a corresponding degree to the left, so that when the pointer 27 is carried to the extreme right, the dial 21 will have been turned back the distance of an em on the dial 21, the effect being the same as if the pointer 25 instead had advanced to that extent toward the right, so that the fractional indication of the rotatable pointer upon the dial of ems will always correspond to the position of the other pointer 27, which in terms of the latter will be translated into a definite number of units.

Surrounding the dial 21 is a concentric ring 21ᵃ which is preferably made of celluloid or other suitable material upon which legible temporary markings can be made opposite the graduations of the dial 21, as an aid to the operator, indicating points at which the lines must be terminated; and for a like purpose a similar strip of tubular material is inserted upon the disk 22, the latter being employed however for a different purpose, namely, to be used in connection with multiple or sectional justifications, in which more than one section of such plural justifications are required to be noted. Thus in such cases the operator will make distinguishing marks, generally employing the numerals 1, 2, 3 and so on, according to the number of sectional justifications to be made in a given line, writing those numbers opposite the unit number corresponding to the fractional units of the respective sectional lines to which such numbers relate. In this class of justification the operator moves his pointer 25 after each sectional justification is completed to the next even unit beyond, when he can proceed as before.

The pointer 25 is clamped to the shaft 26 by means of the handle thumb screw 26$^b$, fitted into the correspondingly threaded half of the split end of the pointer 25, the other half thereof being held against the shoulder of the screw so that by pressing the handle into the position shown in Fig. 1 the pointer will be clamped rigidly to its shaft, and by lifting the handle, obviously the connections will be loosened so that the pointer can be moved irrespective of the position in which the shaft is held. Thus it is made possible for the operator at all times to keep the pointer 25 registering the even units in correspondence with the same indication by means of the pointer 27.

Thus far we have been considering the normal operation of the register mechanism as employed in counting the units and indicating the shortage of a standard line. We will now describe the construction of the parts by means of which the mechanism after having performed its function in connection with a given line may be returned to zero position for a new line.

At the side of the register mechanism is the index release key in the form of a bell lever 75 pivotally supported upon the stud 75$^a$ and held normally against the stop 76 by means of a coil spring 77 one end of which bears against the bottom plate of the register mechanism and the other end impinges against a pin projecting from the side of the key lever holding it in the position shown in Figs. 9 and 10. Upon the key lever arm extending horizontally through the casting of the register mechanism is the thumb piece 78, by means of which that arm of the bell lever 75 may be depressed against the action of the spring 77 whereby two separate functions are performed, namely, the em index actuating mechanism including the lock escapement parts, is disconnected from the register mechanism proper and simultaneously a stop mechanism is operated to bring the dial rotating mechanism to a normal or zero position.

The former of said actions, namely, that of disconnecting the em pointer actuating mechanism, comprises a cam pin or roll 78$^a$ projecting laterally from the upwardly extending arm of the thumb lever 75, which pin when the lever 75 is depressed, is adapted to impinge upon the cam arm at the extreme end of the supporting arm 80 of the rock bracket 81. The tilting bracket 81 supplies the journal bearings for the shaft 26 of the index pointer 25, and is pivotally supported upon the stud 82 of the bracket 83 upon the stop supporting plate 84. Upon the arm 80 is rigidly attached the vertical bar 81 which extends toward the top of the mechanism, its upper end being guided laterally within a slotted bracket 86 pinned to the front plate of the register. A coil spring 87 upon a stud 87$^a$ has one end pressing against a pin projecting from the front plate of the register, its opposite end against a similar pin projecting laterally from the upper end of the vertical bar 81 so that said bar is yieldingly held normally against the rear wall of its guiding slot within the bracket 86. Midway of the vertical bar 81 is journaled the shaft 26 to which the pointer 25 is attached, which shaft 26 it has been seen is connected by a chain of gears to the shaft 23. The gear 29 upon the pointer shaft 26 is normally held in mesh with its actuating pinion 29$^a$ by action of the spring 87 which it has been seen is pressed against the upper end of the vertical bar 81.

Although the said shaft 23 as pointed out is driven continuously in one direction, the pointer shaft 26 need only be given a single revolution, thereby rendering it necessary to establish a zero or normal position of rest for said shaft, and by attaching thereto a spring returning device, means may be provided to that end. Consequently upon the shaft 26 is a coil spring 26$^a$ wound thereon, having one end secured to said shaft and the other held by a pin projecting laterally from the vertical bar 81 of the arm 80 and the gear 29 therefore, when in mesh with said gear chain, is being driven against the action of the coil spring 26$^a$, causing the spring to be wound sufficiently so that when said gear is released from its actuating pinion 29$^a$, it will then by action of the spring be carried back until a stop, which may be a pin or any projecting device suitably located upon the gear 29, impinges against a similar stop upon the said bracket bar 81.

Therefore upon the depression of the release key 78 the pointer shaft 26 will by action of the spring 26$^a$ be brought into a zero position and simultaneously the shaft 23 which carries the dial 22 will likewise be brought to its so-called zero indication, that is to say, it will be brought into a position in which the pointer 27 will be immediately over a sixteenth unit graduation. The last mentioned result is accomplished by means connected with and operated by said bell crank lever that constitutes the release key 75, comprising a stop 90 upon an arm 91 pinned to one end of the rock shaft 92 which is supported in suitable brackets 92ᵃ upon the bottom of the register plate 84 of the register. (See Figs. 7 and 10.) The arm 91 stands normally in a tangential position relative to the gear 41 on the shaft 23. It has been seen that the graduated rim of the unit dial 22 attached to its end is cut into eight equal segmental panels of 16 units each, and accordingly there have been projected from the face of said gear 41, circumferentially arranged thereon, eight pins 41ᵃ equally distant one from another and the stop 90 on the rock arm 91 is adapted to be interposed in the revolving path of these pins whenever said arm is tipped in the direction of the gear 41 and therefore means is provided for advancing the dial 22 to a "zero" position by locating these pins upon the face of the gear 41 in such positions that when they successively impinge upon the stop 90 they will bring the point marking the 16th unit in said segmental panels of the disk 22 into exact registration with the pointer 27 in its normal position as shown in Fig. 1. In order to throw the stop 90 into such engaging relationship with the gear 41 to locate the dial 22 at its normal or zero position an arm 93 is pinned to the rock shaft 92 at its opposite end and is actuated by means of a connecting rod 94 extending from the upright arm of the bell lever release key 75 to the top of said arm 93. Hence as the release key is depressed the arm 91 throws its stop into the path of the pin 41ᵃ; and likewise the arm 91 through the connecting means described carries the stop 90 out of engagement with the pins 41ᵃ by action of the spring 77 upon the bell lever key 75 being released as shown in Fig. 10.

But before the unit dial can be released in the manner just described the lock slide 55 must be raised, for the reason that the stop lever actuating gear 41 is normally locked as has been seen, by said slide, which it has also been seen, is always unlocked when the gear 41 is driven forward to set the indicators, being then lifted by action of the electromagnet 60 through its armature lever 61 elevating the slotted bar 65 to which the lock lifting finger 57 is attached. It is therefore provided that when the stop lever 91 is rocked toward the gear 41 in order to present the stop 90 to the pins 41ᵃ, a pin 91ᵃ in its extreme upper end is adapted to impinge against the depending arm of a bell lever 95 pivotally supported in suitable bearings upon the upright bracket plate 56ᵃ which also supports the bracket 56, having its other end operably connected with the lock connecting bar 65 so that as said hanging end is forced inwardly the other arm will cause the bar 65 to be elevated, thereby lifting the lock slide 55 out of engagement with the teeth of the gear 41, with the result that by action of the spring motor 30 the stop gear 41 will be carried forward in the same manner in which it is advanced to register units until the stop pin 41ᵃ next in position impinges upon the stop arm 90, whereupon on releasing the key 75 its spring 77 in the manner already described will carry the stop arm 91 out of engaging relationship with the stops of the gear 41 and the bell lever 95, while the spring 63 of the armature lever 61 will operate to carry the connecting bar 65 downwardly, thereby bringing the lock 55 into position to hold the gear 41 at such zero position, the stop 90 having been entirely withdrawn from the path of the stops 41ᵃ immediately upon the lock 55 coming into engagement with the teeth of said gear 41.

The counting mechanism is therefore by action of the bell lever release key 75 in a position to begin registering the units for a new line, inasmuch as the index pointer 25 and the unit dial 26 having both been brought into their zero positions are now connected up and free to repeat the joint operations already described.

*The justifier mechanism.*

The operator having followed with his eye the progress of the index pointer 25 on the dial 21, concludes the line before the index reaches the end of the standard line, to which he intends to justify his line, and then glances from the pointer 25, bearing in mind the number of ems it stands short of the required measurement, to the dial 22 of the unit index which tells him the exact number of units necessary to complete the full line of his composition, if the index finger has stopped at a point intermediate of the graduations marking the even ems. It will therefore be required to select one of 64 keys which corresponds with the exact number of units so indicated as necessary to complete the line which he is setting. The keys therefore bear upon their face the number of units to which each key relates, it being noted that for the convenience of the operator it has been arranged to have not the total number of units marked in the order from 1 to 64, but grouped in four banks of 16 units each, the keys of each bank marked from 1 to 16. Therefore the keys are arranged upon the keyboard in four stepped planes, a group of 16 keys upon each plane, the upper group corresponding literally to the total number of units to which they relate. The next group however will represent units to be justified from 17 to 32, inclusive and similarly the next following from 33 to 48 and the next 49 to 64 units although as pointed out each of the three succeeding groups of keys bear only the numerals 1–16 the same as the top group.

This arrangement of the keys of 16 each corresponds with the similar arrangement on the unit dial showing successive panels having units marked similarly from 1 to 16 only thereon. It is necessary, therefore, for the operator to consult the dial indicating ems to learn the number of ems his line lacks and also if there is a fractional em that fact will be indicated, although he will refer to the unit dial to show how many units such fractional unit signifies. He will therefore counting from the top select a key from the group of keys which corresponds to the number of ems the pointer indicates in that manner, that is to say if his em dial indicates two and a fraction ems shortage, he will pass over the two upper banks of keys and select the key in the third bank bearing the unit number to which the pointer 27 directs him.

It will now be described how by the depression of one of the justifier keys 15, the positions of selective collars upon the respective justifier controller selectors, will thereby be determined so that when introduced into the index mechanism of a casting machine that selector will set the justifier mechanism to justify lines of type in accordance with the unit measurements as indicated.

We have heretofore described in connection with our said Patent #964,678, a system of justification of types on the basis of 16 units to the em and employing 13 sizes of spaces in the accomplishment of the justification therewith of lines of not exceeding twenty spaces. It will therefore not be necessary in the present application to describe again in detail the mechanism there specified except in occasional reference to the essential features thereof, which will be briefly referred to in this connection.

Three circuits may be employed simultaneously in setting the justifier mechanism under the system described in said patent, as follows: One of said circuits is employed to set the space sizing mold circuits later to cast the desired size or sizes of spaces to be inserted in a given line, which may be any one of 12 different "row" circuits so called. The second of said three circuits is employed to set a so-called circuit changer for different sizes of spaces, which counts the number of spaces of the unit value first used, and determines when the change shall be made to the other unit size, which may be any one of the ten "individual" circuits above described; and the third circuit to be employed in setting the justifier, is the so-called "shift" circuit which reverses the order in which the electric current normally enters through the justifier to the mold sizing stops, to control the order in which space values are selected.

Therefore, means have been provided in connection with our present improvements for actuating what is called the selector setting mechanism, the salient features of which are here illustrated (see Figs. 29, 30 and 31) wherein the selector collars are set in accordance with the requirements of the three circuits to be set as above referred to.

The said selector setting mechanism comprises two sets of electro-magnets arranged at either side, comprising the so-called "row" and "individual" king and stop magnets, respectively. That is to say, upon the right hand side as you face the selector are arranged the row stop magnets 207, one of which is shown at the right hand side of the sectional plan view in Fig. 29, and the corresponding individual stop magnets 217, being similarly and oppositely arranged at the left hand side thereof. The respective row and individual magnets are electrically connected by means of armature levers $209^{1-14}$ and $219^{1-14}$, respectively, to character keys by the depression of which proper magnets are adapted to be energized, or the same may be actuated through the automatic justifier device, to slide respective stops 208 and 218, respectively, which are correspondingly arranged upon the sides of the selector channel 225 at the point where the selector is temporarily held while being set, so that whenever a stop bar is thus projected toward the selector by action of its respective magnet, its forward end will be in the path of the sliding collar 221, and may accordingly be located at various selective positions along the shaft of the selector governed by the particular stop bar projected thereby. Similarly secured to the selector mechanism is the row king magnet 206 upon the right hand side of the selector mechanism, and also the individual king magnet 216 placed at the left hand side thereof, having armature levers $206^a$ and $216^a$ respectively (partially shown in position in sectional view in Fig. 29). The armature levers of the respective "king" magnets will be given lateral motion in opposite directions when their respective magnets have been energized so as to carry the collars 221 against the corresponding row and individual stop bars 208 and 218 at the respective sides, actuated by corresponding stop magnets 207 and 217, respectively. The king magnets are not shown in the drawings, and only the extreme end of the levers operated thereby in sectional view in said Fig. 29, but in said figure, in dotted positions, the levers are shown to have moved both collars to a setting position as indicated in outline; therefore when current is turned into the circuit of any one of the row or individual stop magnets it passes in series through the corresponding king magnet so that the two levers move practically simultaneously although the stop magnet being first to be energized, precedes the king magnet somewhat in performing its function.

The row and individual stop magnets are each 14 in number, and all of them are employed when setting the matrix plate in the process of casting character type and spaces, and their respective circuits are connected to the corresponding character keys 5 in the manner fully described in our said patents. However, for the purpose of justification, as pointed out above, 12 only of the row magnets are employed for the reason that that number of row circuits are sufficient for setting the justifier mechanism. Likewise, 10 stop magnets only are required on the individual side in setting the justifier lever and when said row and individual magnets are employed for the purposes of justification they are energized through the operation of the justifier mechanism presently to be explained.

The shift magnet 211 which sets the central collar of the selector is only employed in setting the justifier selector, and consequently it too will be energized automatically by said justifier mechanism.

In our Patent No. 964,678 above referred to, we have shown by charts all possible justifications up to and including 64 units, having a mechanism of 20 spaces, that is, of lines not to exceed 21 words; and we have also shown in said charts the number of spaces of one value and the number of the next higher or lower unit value required; and furthermore charts have also been shown therein of circuits necessary to be employed in connection with the collar setting mechanism disclosed therein which is employed in the operation of our present invention, and it is therefore not deemed necessary in the present specification to reproduce these charts, it being considered sufficient to show for present purposes the means here employed for making the selection in accordance with such predetermined justification combinations.

Therefore we will now proceed to describe our said means for selecting the circuits required to justify lines of type requiring 64 units of justification.

In its general features, briefly stated, the automatic means employed in connection with our present embodiment for selecting proper selector setting circuits as above described, comprises a vertically guided drop head 160 (see Figs. 14 to 28) in which a plurality of yielding contact pins 161 are adapted to slide vertically therein. In our present machine there are twenty-two of these pins and they are thus suspended immediately above a like number of electrical spring contacts 156, similarly arranged, so that each of said contacts will receive a corresponding pin 161 upon the drop head being depressed sufficiently for the purpose. The contacts constitute the respective terminals of the justifier setting circuits which have been described as operating the various stop magnets of the selector setting mechanism. Twelve of these terminals, therefore, will correspond with the twelve "row" stop magnets of the selector setting mechanism, nine thereof to the corresponding "individual" stop magnets, and the remaining terminal will connect with the "shift" magnet, which twenty-two terminals therefore supply connecting means for all of the justifier setting circuits. Means are provided, when the drop head is lowered, for holding certain of these pins as desired out of operable connection with the corresponding terminal contacts, consisting of a plurality of thin steel plates, any one of which may be slid horizontally underneath the vertically operating drop head, which plates have perforations of a size to admit of the free passage therethrough of a contact pin and these perforations are so placed in the respective plates as to bring one, two or three of said plates, as may be predetermined, into contact pins, as may be predetermined, into contact with its corresponding spring terminal below the plate which has thus been interposed in the path of the drop head as it is carried downward.

The plates, which may be termed justifier plates, will be twenty in number, when used in the justification of lines which may have as many as twenty spaces therein, each plate being devoted to the justification of all lines having a given number of spaces to be inserted therein. These justifier combination plates are conveniently arranged one over another with that relating to the one-space lines at the top, while the one for the twenty space lines is at the bottom and intermediate plates suitably arranged in the order indicated. Each plate is longitudinally divided in 64 imaginary sections corresponding to the possible 64 units of maximum justification and will therefore have in the first section located at the front thereof, perforations corresponding to the justification of lines requiring one unit, and proceeding to the rear of the plate the successive stages or sections relate to 2, 3, 4 units and so on up, to the full 64 units of justification of our present form of justifier.

Means are therefore provided for drawing one or the other of said plates as required forwardly to a position corresponding with the aggregate number of units of justification required in the line to which said plate relates. That is to say at each time the operator reaches the end of a word he presses a space key which elevates the mechanism a space key which elevates the mechanism carrying the plates one step, which he repeats for each additional space in the line so that the plate 200 will at the end of each word have been raised to the proper position to be withdrawn and advanced to that point under the drop head 160 corresponding to the total number of units to be divided between the number of spaces thus recorded in the line thus to be justified.

The location of the justifier plates at the points which refer to unit totals, in the manner indicated, is accomplished by the depression of one or the other of the justification key levers 15, each of which corresponds with a sliding stop 175 (see Figs. 21 and 23), of which there are accordingly sixty-four arranged immediately in front of the receptacle, in which the plates are held while being elevated, for the purpose described. Hence, when the respective stops 175 are moved laterally, they are thrust into the path of the advancing mechanism that carries the plate out of the plate holding frame so that by positioning the stop slides of the justifier keys so that each will stop a plate at a point representing the total units of justification required, by properly labeling or marking such key in accordance with such total unit justification value, means will be provided whereby any one of the selected plates will be advanced to a predetermined position in accordance with the units required for such justification, each plate having had its combinations of perforations suitably placed relative to such total unit shortage to be divided up into the number of spaces to which that particular plate relates.

To the mechanism which has been provided for advancing the justifier plates against the particular key stop as selected by the operator, have been added connections whereby electrical switches are operated to turn the current into the pins of the vertically sliding head at the point when the plates have been located in proper position to permit the required pins to make contact with the justifier circuits. Generally described, this is accomplished by means of a segmental contact arm 185 (see Figs. 16 to 20) which is thrown into position for making the required contact by spring action immediately upon the justifier plate having been located and is held in such required position of furnishing the current to the necessary stops by suitable retaining latching mechanism, which is required to be released by the operation of an independent key which when released also permits the plates to be returned by spring action and which further causes the frame elevating mechanism to be returned to its normal zero position subsequently to the selected plate having been returned to its proper position within the plate elevating mechanism. Simultaneously with the return action of the plate advancing mechanism the contact segment arm 185 by action of the return or release lever 190 is carried into opposite position bringing into action new contact devices which in turn set a trip selector the use of which will be further explained in another connection.

The mechanism for elevating the respective plates in accordance with the number of spaces required to justify the line is operated by an electromagnet 130, as is also the vertically sliding drop head 160 and its respective magnets 165 are energized by means of circuit connections successively made by the above mentioned segmental contact arm 185. That is to say in the position to which the segmental arm is first carried (by action of its spring 185$^b$) it closes contacts to energize the magnet 165 to operate to lower the cross-head immediately upon the plate being advanced into the proper position, and the required row and individual stop magnets of the justifier selector setting mechanism are electrified through the action of the contact pins 161 in the cross-head, being permitted to enter the proper switch contact 156, as explained. Thereupon, by the depression of the release key 190 above referred to, which carries the segmental contact arm into its opposite position, the "individual" king magnet of the selector setting mechanism is operated to slide the collar upon the trip selector to its final or fifteenth position, no stop having been interposed into its path. The space magnet 130 is operated from the keyboard when the operator depresses the space key 10 at the end of each word, as has been pointed out.

Having thus outlined the salient features and operation of the automatic means employed for setting justifier selectors, we will describe with more particularity those elements.

The keyboard 16 of the justifier is supported upon a rectangular horizontal frame extending forwardly from the justifier casing which in turn rests upon the table 3 upon its lateral extensions or feet 104, at the right hand side of the character keyboard 1. The justifier framework comprises a body portion or box-like casing 101 which contains a series of steel justifier plates 200 preferably made of spring steel of this construction, said casing having rigidly attached thereto the extension 102 above referred to as supporting the justifier keyboard 16, which extension also supplies suitable guideways provided on the inner side thereof for presenting a single plate 200 to the justifier circuit selecting mechanism.

The body portion 101 incloses the plate holder or carrier 110 guided vertically therein by means of similar guides 112 at either side, into which extend corresponding guiding grooves 111 made by the parallel guides on the respective sides of the plate holder 110. Extending from the bottom of the plate carrier rigidly secured thereto is the stem 115 upon the rearward side of which is a gear rack 116, the stem being guided to slide vertically in the openings 115ᵃ in the bottom of the body portion 101 and a similar bearing 115ᵇ in the bracket 103 which extends downwardly from the bottom of the frame portion 101. A pinion 117 is pinned to a shaft 118 which finds suitable bearings in the said bracket 103 and has pinned upon its opposite end a segmental ratchet wheel 120. The pinion 117 is permanently in mesh with the rack of the stem 115 and supplies the means for elevating the plate holder and is actuated through the operation of a pawl 121 loosely pivoted at the lower end of the actuating arm 125 suspended from the shaft 118 loosely mounted thereon adjacent to the ratchet segment 120. The pawl 121 is normally held against the periphery of the ratchet segment by means of the coil spring 121ᵃ wound around the stud supporting said pawl and having one end impinging against a pin projecting laterally from the rearward extension 123, the farther end of said spring being similarly held against the pin 124 projecting from the arm 125. The pawl actuating lever 125 is moved by means of an electromagnet 130 which when energized by action of the space key 10 making contact in a manner which will be presently explained, causes the armature lever 131 in being drawn to the magnet to be swung upon its pivotal bearing supplied by the stud 131ᵇ in the bracket 131ᵃ secured to the bottom of the body portion 101 and having its free end connected by means of a link 133 with the outer end of the pawl actuating arm 125, the movement of the armature lever 133 being sufficient to move the segment ratchet 120 the distance measured by one tooth on the periphery thereof. The armature lever 131 is normally held away from the magnet 130 by means of a coil spring upon the stud 131ᵇ, one end of said spring impinging against a pin projecting laterally from said bracket 131ᵃ, its other end similarly held against a like pin projecting laterally from the armature lever.

Upon the bracket 103 is pivotally supported the detent 135 adjacent the periphery of the segmental ratchet wheel 120, having its tooth end held in engaging relationship with the teeth of said ratchet by means of a spring 136 wound upon the stud 135ᵃ which secures said detent to said bracket, having one end thereof bearing against a pin suitably projecting from said bracket, its opposite end similarly contacting the pin 137 on said detent. Thus upon each impulse of the magnet 130 the ratchet segment is carried to the circumferential length of one tooth and the plate carrier 110 is correspondingly elevated one step and thereby the plates 200 are successively elevated to a position at which they may be withdrawn from the holder 110. To this end the respective plates have provided therefor horizontal guiding slots 113 in the opposite sides of said carrier holder 110 which extend horizontally along the opposite inner faces of the said plate holder and spaced apart one over the other in accordance with the required thickness of the plates which determines the amount of elevation required of said holder each time acted upon by the pawl actuating lever 125 in the manner explained. The forwardly extending guiding frame 102 secured to the body portion 101 has within its respective sides the similar guiding slots 105 oppositely disposed and corresponding to the plate-guiding slots 113 in the holder 110, that is to say the guiding slots 105 will coincide with the successive pairs of grooves 113 in said holder as it rises through the successive stops by which it is elevated in the manner described.

The justifier plates 200 which are rectangular in form and made of thin sheets of spring steel are 20 in number, one for each number of spaces to which our present embodiment applies. Each plate has centrally placed in the forward end thereof (see Figs. 24 and 25) a notched or hooked opening into which is adapted to fit a T-shaped projection 141 on the sliding cross-head 140 which cross-head is supported at either end in guideways 106 suitably provided in the sides of the extension bracket 102, said guideways being located immediately above the plate guiding grooves 105 and parallel therewith. The cross-head 140 stands normally in the respective ends of its guiding slots 106 adjacent the body portion 101 in such position that the plate holder 110 as it is elevated in successive steps carries the openings 201 of said plates successively into operable connective position with the T-shaped portion 141, so that when one of the 20 plates 200 is brought into such connection, it will be withdrawn from the holder 110, upon the cross-head 140 being carried to the opposite ends of its corresponding guides 106.

Means employed for carrying the cross-head forward to withdraw one of the plates 200 in the manner indicated comprises a pair of lever arms 143 which are pinned to the respective ends of a shaft 142 (see Figs. 16 and 17) which is loosely mounted in suitable bearings provided by a bracket 142ᵃ at the lower extremity of the main bracket 103 depending from the bottom of the body portion 101. At either side of the cross-head 140 is pivotally attached on end of a link 144 which is in turn similarly attached at its opposite end to the swinging end of the corresponding lever 143.

The levers 143 are rocked on their shaft for the purpose of thus advancing the cross-head 140 to withdraw the plate 200 by means of a justifier key lever 145 (see Fig. 2) which is pivotally attached to the side of the character keyboard 1 and conforms in construction to a long bar lever loosely mounted upon a pivotal bearing, being held normally in an elevated position on the pivot 145$^a$ by means of a coil spring 145$^b$ having one end held against a pin projecting from the side of the frame of said keyboard, the other end similarly contacting a pin projecting from the side of said key lever. Upon depressing the free end of the lever 145 it contacts a wrist pin 147$^b$ on the end of the short bent lever 147 which is secured to the outer end of a shaft 148, suitably supported in bearings supplied by the brackets 148$^a$ at the top of the body portion 101 of the justifier frame, and thereby causes a lever arm 149 also attached to the shaft 148 to be elevated until brought into contact with the stop 149$^a$, thereby rocking a short fulcrum lever 150 which is loosely mounted upon the outer end of the shaft 142 immediately adjacent one of the arms 143 that advance the cross-head 140, a connecting rod 151 being pivotally attached to the outer end of the lever arm 149 and similarly united with the corresponding arm 150$^a$ of the said lever 150. The bell lever loosely mounted upon the shaft 142 adjacent a lever 143 is yieldingly connected therewith by means of a coil spring 152 wound upon the shaft 142 having one end operably connected with a pin projecting from the arm 150$^b$ and having its other end similarly attached to a like pin projecting from the side of the adjacent lever arm 143. The spring 152 is wound to sufficient tension to carry the lever in propelling the cross-head 140 with the attached plate 200 to the full extent of its stroke, overcoming the ordinary frictional resistance thereto, but permitting the cross-head to be intercepted at intermediate points of the travel of the cross-head, while the bell lever 150 may continue to the limit of its travel, in which position it will be temporarily retained while performing a function presently to be described.

Upon the front wall of the box frame 101 rigidly attached thereto is a block 155 formed of any suitable insulating material in which are vertically disposed and grouped in a manner presently to be more fully described, the spring contact devices 156 which are attached to and form the terminals of the electric circuits employed in the justification of lines in the operation of our justifier. The spring contact terminals therefore are spaced so that their open mouths stand within a plane immediately beneath that within which the plates 200 are advanced upon being withdrawn from their holder in the manner described. Immediately over the contact plates is a drop head 160, constructed in the form of a rectangular frame the brackets 160$^a$ extending from the sides of the box 101 having guiding bearings within which the drop head 160 is adapted to slide vertically. Within suitable bearings in the corresponding upper and lower bars of the drop head 160 are suitably supported a plurality of contact pins 161 which normally rest upon their shoulders 162, supported on the bottom cross-bar thereof an open coil spring 163 being provided upon each of said pins, one end thereof bearing against the collars 162 the other held normally against the top horizontal bar of the drop head. The frame of the head 160 is preferably made of a high electric conductive material into which the electric current will be conducted in a manner presently to be described, and accordingly the pins are likewise adapted to conduct the electric current from the frame to their lowermost points, when brought into contact with corresponding pins 156, and thereby close a circuit to the selector setting mechanism of the justifier.

Therefore for the purposes of justification it is necessary to provide means for controlling *ad libitum* the electric connections between selected pins 161 and their corresponding contacts 156 which connections are provided by means of the relative positions of the perforations 202 in the plates 200, both as to the combinations of perforations required for each individual justification and also in regard to the relative location of the combinations on successive plates. That is to say, upon each plate there are 65 successive positions longitudinally considered and in each one of the 65 positions there may be a perforation for any one of the twelve row terminals required in the scheme of justification to which our present invention relates, as pointed out, and likewise a similar perforation for any one of the ten individual circuits, and similarly a perforation relating to the shift mechanism also connected with reference to the so-called shift circuit.

The manner of locating the row and individual perforations 202 for any given justification will depend primarily upon the position of the contacts 156 which are adapted to correspond with their respective pins 161 and therefore for the present we will describe the method of locating the plate by action of the justifier keys 15 which it has been seen are grouped in a keyboard 16 that rests upon the justifier framework. The means have been described whereby the cross-head 140 by the depression of the justifier key lever 145 may be carried to the full extent of its guideway or held at any desired intermediate point. At the front side of the cross-head 140 is an abutting block 170 (Figs. 21, 22, 23 and 24) from the forward surface of which projects a short pin 171, the top portion of which block 170 travels in a plane below a series of laterally sliding stops 175, the latter being adapted to interject their lowermost extremity 176 into the path of the traveling block 170 by operation of a justifier key 15 in such a manner that the pin 171 will extend into a rectangular notch 177 cut into the lowermost surface of said extension 176 which pin will act as a stop to hold any slide 175 in such engaging position until the cross-head 140 and plate operably attached thereto in a manner presently to be described is forcibly withdrawn therefrom.

There are 64 of the sliding stops 175, each of which is suitably connected with a corresponding justifier key 15, said slides for compactness of design having been arranged symmetrically in two similar rows of 32 slides each having their outer ends supported in vertically disposed slots constituting guides cut in the said pieces 17 of the justifier keyboard, having their forward ends interlocking the slides of one series supplying guiding means for the respective ends of similar slides of the opposite side which are therefore alternately and oppositely disposed one to the other, the forward ends of the slide having a bottom bearing portion 178 which rests upon the plate 18 at the bottom of the justifier keyboard frame.

In the bottom plate 18 below the point where the surface 178 of the slide 175 rests are a series of pockets 180$^a$ within which are the compression springs 180 which bear at one end against a stop surface 179 supplied by the extension 177 of said slide 175. The opposite end of the compression spring 180 bears against an adjusting screw 181 threaded into the outer end of the pocket bore 180 so that normally the stops 175 are held in the position shown in Fig. 21 with their forward ends abutting against the ledge 18$^a$ of the justifier keyboard bottom. From each of the slides 175 a cam pin 175$^a$ projects laterally which is adapted to be engaged by the oblique under side surface 182 of the bottom extension 183 of the justifier keys 15.

The justifier keys 15 are vertically supported in the plates 16 and are normally held by means of a compression spring 15$^a$ in the elevated position shown in Fig. 21 and upon their depression against the action of said spring the cam surface 182 engages the pin 175$^a$ and forces the slide outwardly to the right or to the left, according to the series in which it is located, into the position shown in Fig. 2 in broken lines, whereby, the extension 176 is carried into the dotted central portion shown in said figure, which is in the direct path of travel of the block 170 of the cross-head 140, and which will be held in such position by means of the nib 171 engaging in the niche 177 cut in the bottom portion of said forward extension 176 of the slide 170 after the key has been carried up by action of its spring in the manner described. Thus the key can be released immediately upon the cross-head being brought into contact with the slide 175 and the plate held in the position to which it is thus drawn until the contact establishing drop head 160 shall have been carried down immediately following the advancing of the plate into such intercepted position.

It has been seen that after carrying the plate 200 into a forward operable position by reason of the bent lever 147 having been brought into contact with the justifier lever key 145 as just described, the bell lever 150 will be carried by the continued depression of the justifier key 145 into its extreme position and in doing so an electric contact will be made, by means presently to be described whereby the current will be turned into the drop head 160 to be transmitted through whichever pin has been brought into contact with a spring contact terminal 156 below the plate to form connections necessary to actuate the selector setting mechanism, as described. Hence, in order further to accomplish this purpose there has been provided upon the periphery of a contact segment 185 pivotally mounted upon the bracket 103 a switch 290 comprising the insulated contact plates 291, 292 and 293 at the respective sides thereof, which will be thrown into successive positions to effect such electrification of the circuits in a manner next to be described in detail.

The segmental switch 290 (see Figs. 18, 19, 20 and 32) comprises the three contact plates 291, 292 and 293, the plate 291 on the left hand side thereof and the plates 292 and 293 on the right hand side, which plates are adapted to be carried circumferentially into three operable contacting positions relatively to the contact points 295 suitably mounted upon a bracket 296 constructed of any suitable insulating material, said contact points having respective electric contacts as follows: 295′, being connected with the inlet series, contact 295$^2$ connecting with the relay magnet 197, the contact point 295$^3$ receives the return wire from the relay magnet and the point 295$^4$ leads to the "individual" king magnet, which will be more fully explained in another connection. There are accordingly three operable positions of the switch segment 185, the central or normal position of rest shown in Fig. 18, making no closed electric contact, while in the first or elevated position as shown in Fig. 19 connections are made by virtue of the peculiar shape of the switch plate 291 to energize the relay magnet 197 and at the same time by reason of the contact 293 on the right hand side of the switch, being brought into operable position the current is received from the relay point and transmitted to the justifier keyboard arm, thence to the drop head 160 and through which even unit pins 161 may have been brought into contact with spring contact terminals 156 to the corresponding magnets in the selector setting mechanism.

Therefore, in order to conduct the electric current into the pins 161 it will be necessary to elevate the segment 185 into the position shown in Fig. 19 in order to turn the current through the justifier framework into a pin 161, thence into a corresponding contact 156.

While the switch segment is in the elevated position just described it will be recalled one of the plates 200 has been carried forward by the depression of the justifier lever key 145, and is being held in such advanced position by the stop slides 175 which had been displaced by a justifier key 15.

The means thus far described provide only for the setting of the justifier selector in its electrical aspect. We will now describe more in detail the electric segment 185 and the means whereby it is operated into the required position for thus energizing the keyboard frame and the contact springs in the block 155.

The segment lever 185 is loosely pivoted in a bracket upon the main bracket 103 and has a depending arm 188 secured to the shaft to which the switch contact plates of the segment 185 is pinned, said arm having a radial bearing portion 189 against which bears a sliding block 153 on the connecting rod 151 that is employed in actuating the bell lever 150 which it has been seen by means of its yielding connection with the levers 143 is employed in withdrawing the plates from their holder for the purposes of bringing the plates 200 into position to permit electrical contact between the pins 156 and the spring contacts 161 in the manner above described. The depending arm is held laterally against the block 153 by means of a coil spring 185$^b$ upon the shaft to which the segment and its depending arm 188 are attached, said spring having one end held laterally against the pin 188$^a$ projecting from the lever 188 upon which is pivotally mounted one end of a connecting rod 191 which is similarly connected at its opposite end to the release key bell lever 190. Thus by action of the spring 185$^b$ the depending arm 188 is held in normal position against the block 153 and by the same action the release bell lever 190 is held in its normal elevated position, in which position the segments 185 are held in their neutral noncontacting position shown in Fig. 19. At the forward surface 189 of the depending arm 188 is a rectangular notch 192 of sufficient width to receive the block 153 on the link 151 so that as the said block is elevated in the position to be received thereby, the arm 188 will by action of the spring 185$^a$, be carried in the direction of said block, to the depth of the notch 192 which is so designed that upon reaching the bottom of said notch the sector switch 290 will have been carried into the uppermost position as shown in Fig. 19 which it has been seen makes the connection whereby the current is carried into the drop head 155 and thence through the pins 156 passes into the spring contact pins 161 of the terminals of the selector setting circuits employed in the preparation of the justifier selectors. The notch 192 having its lowermost surface at right angles to the travel of the block 153, it is apparent that it will operate to hold the block 153 within the same, thereby retaining the bell lever 150 in position to hold the plates 200 against the justifier key stop 175 until the arm 188 shall be thrust in the opposite direction, thereby releasing the block 153 and permitting the plates to be carried back into their holder by action of the coil spring 146 on the shaft 148.

By exerting pressure upon the bell lever release 190, however, the depending arm 188 will be carried to the extreme opposite position (shown in dotted lines in Fig. 17), in consequence of which the sector switch 185 will be carried into the position shown in Fig. 20, whereby the relay 197 is again connected to supply current which from the relay point is conducted by means of the insulated plate 292 to the contact 295$^4$ and thence to the "individual king" magnet, whereby the trip selector is set simultaneously with the return of the plate selecting mechanism to its normal position as above.

Although the fulcrum lever 150 will be carried into its normal position of rest by the action of its spring 146 upon the shaft 148, thereby to permit the plate 200 to be returned, means have been provided in addition to the action of the spring to return by positive action the parts to their zero position by means of a camming guard 193 extending from the inner side of the depending lever 188 being attached to said lever immediately above the notch 192 the under surface of which camming guard is adapted to impinge against the top surface of the block 153 so that as the release key 190 is depressed and the arm 188 is thereby swung into the position shown in broken lines in Fig. 17, the guard arm 193 will force the block downwardly thereby carrying the bell lever 150 into its normal position of rest. Thus, the operation of the release lever which it has been seen establishes electric connections whereby the trip selector, is properly set, also by action of the cam guard 193 relieves all possible obstructions that may be interposed to the levers 143 returning the plate that has been theretofore withdrawn to its normal position of rest, which action of the cam guard in returning the bell lever 150 to its normal position of rest is completed before the ratchet and detent have been released for the pawl 121 and the detent 135 are carried out of engagement with the segment ratchet wheel 120 which action is accomplished by means of the bell lever arm 188 impinging upon the pin 128$^a$ of lever 128 on the shaft 127 (see Figs. 14 and 17), thereby tilting the two armed lever 126 at the opposite end of said shaft to lift the respective pawl and detent out of such engagement with the segmental ratchet 120.

The spring contacts 156, it has been seen, form the terminal connections for the respective "individual," "row" and "shift" circuits by means of which the collars of the justifier selectors are set to the corresponding row, individual and shift positions. These spring terminals, and the contact pins 161 of the drop head 160 are for the economy and convenience of construction arranged as viewed in plan in two transverse lines, those pertaining to the row and individual circuits respectively grouped at opposite sides of their respective supporting means, the row and shift circuits in the present machine terminating at the left and those of the individual at the right hand side thereof. The justifier plates 200 therefore are each accordingly divided by an imaginary longitudinal line, as at $a$—$a$ (Fig. 25) into "row" groups of perforations at the left hand side, "individual" groups at the right, and the "shift" perforations being included for convenience with the "row" perforations. There being one shift terminal and twelve row terminals there are accordingly thirteen positions in the row section, and likewise nine positions in the individual section to correspond with the so-called individual circuits to which they relate. Referring to Figs. 25, 26, 27 and 28, showing respectively plates $200^1$, $200^6$, $200^{10}$ and $200^{20}$ these rows and individual positions are designated by longitudinal markings the even numbers thereof being set down opposite the said markings, the row marking at the extreme left having the letters "SH" representing the terminal position of the circuit of the shift electromagnet. As pointed out, the pins 161 and the spring terminal contacts 156 are arranged in alternate order in parallel lines so that the row terminal contacts of the odd numbers are in one of the said lines and those of the even numbers in the other, or to be more particularly specified the terminals of the odd numbers in the row and the even numbers in the individual layouts are in the second line of the terminal block 155, while the even numbered terminals of the row and the odd numbered terminals of the individual layout are in the first line of the block 155.

It has been seen that the justification under our present plan attains to 64 additive units maximum spacing, that is to say any number totaling one, two, three or more up to and including sixty-four units will be divided up into the number of spaces that occur in the particular line to which the justification relates, and it has been seen that there is a plate for each number of spaces and all possible justifications have been recorded thereon for the number to which it refers. Therefore on each plate there must be from one to sixty-four successive positions longitudinally considered in which a complete combination of perforations may be made for each justification of from one to sixty-four units. Accordingly the plates 200 have thus been subdivided into such theoretic positions or sections which have been marked thereon in Figs. 25 to 28 by transverse lines having set opposite to those representing even numbers of units the numerals corresponding thereto. Although there are only sixty-four units corresponding to the additive justification there is in fact one additional position marked thereon, representing the position of the plates when normal spacing of four units is called for, which is also designated as "zero" justification for being of the minimum or normal spacing no additive justification is required. Therefore there are shown 68 transverse lines marking the 65 positions to which a plate may be advanced (including that of normal spacing) in effecting justification and three extra lines to correspond to the distance apart of the pins 161, which are in the form illustrated so placed that two line positions intervene. Thus it will be found that the so called "section" overlap and that between the two lines of each section will be included the two first lines of the two sections immediately following.

Therefore it will be apparent that by locating the perforations in each successive section of a given plate in accordance with the predetermined units of justification required for the corresponding unit shortages for those sections, such plate being located with reference to the terminals 156 by means of a justifier key 15 in the manner described, so as to bring proper sections of the plate immediately over said terminals so that for each successive position, a single row and likewise a single individual circuit will be energized, for the reason that the respective two rows of pins 161 and contact springs 156 are arranged to coincide with positions of perforations in the plates. Likewise, if required, a shift circuit will thus also be closed, so that the selector setting mechanism will be properly actuated to prepare a justifier selector. For example, by referring to Fig. 25 and examining a representation of the plate 200¹ which is designed for use in setting justifier selectors for one-space lines, it will be seen that the perforations in the first section or grouping (represented by the cross-lines 1 and 4) are perforations corresponding to the first "row" and tenth "individual" terminals, both of which, in the example chosen, are to be found in the second line of that section, marked as line four on the diagram, a second perforation in line four being eliminated from present consideration for the reason that it is in the position of the even "row" terminals of the first line of row pins 161 and contacts 156. In other words as the first section, so-called, refers to the additive justification of one unit, or five units (including the four unit minimum), therefore the mold sizing stop for 5 unit body size will be required to be energized in the casting machine to produce that size of space, which requires that the controller device will be set to produce that result.

The present embodiment of our machine, as has been already referred to, is designed to be employed with a justifying device similar to that described in our said Patent No. 964,678 for a justifying machine. In connection with the specification thereof substantially all possible justifications are published with the row, individual and shift circuits tabulated in connection therewith. We do not, however, desire to limit the scope of our invention to such specific layouts for the obvious reason that any similar layout of circuits could be employed in conjunction with the mechanism herein disclosed for the effective justification of type. In fact the plates 200 and the terminal block 155 as here laid out are slightly modified from those to which said charts refer, namely, the shift position as at present employed is located aside from the "row" positions, and not as the thirteenth row as there referred to; and likewise, the tenth individual position is here employed for the zero or minimum justification where the eighth individual was there used therefor. Yet for convenience of illustration, if so desired, reference may be had to said patent, and the tables prepared in connection with the specification thereof, where it has been shown that, in the case supposed above, the one unit additive justification will require for a single space five units, and that the eighth individual and first row circuits will be employed to prepare the justifier controller therefor. Modifying the circuits layout as above pointed out in our present plan, we will require the tenth "individual" (instead of the eighth) and the first "row" circuit terminals to be connected. Therefore, referring back to the plate 200¹, the first section thereof provides electric contacts for the first row and the tenth individual terminals, a justifier selector will therefore be set by means thereof to cause a five unit space to be cast therefor.

In like manner all the sections of the plate 200¹ as well as of the other plates illustrated in Figs. 26, 27 and 28 will be found to present combinations of layouts to select the circuits to set the selectors, or punch the ribbons or otherwise prepare the controller device to cause spaces of proper unit values to be cast to justify lines having the number of spaces to which the particular plate refers for the additive number of units as indicated at the side of the drawings upon the cross lines thereon.

In this manner the full complement of twenty plates may be designed or if desired a greater number of plates may thus be prepared with perforations located in the same manner.

The electric circuits by means of which the mechanisms for the type selector setting, the justification, the counting, the line canceling, and the various other mechanisms are operated, are shown in Fig. 32 and described in the following:

The current for connecting the machine may be from any suitable source, such as a direct current lighting or power circuit. A suitable switch or plugs indicated in Fig. 32 by the terminals 300 and 301 connect the supply main with the inlet and outlet wires 302 and 303 and with "IN" and "OUT" switch terminals 304, 305 of the diagrammatically illustrated switch 308, by means of which connection may be made with the switch contacts 306, 307 and the wires 309, 310 connected therewith. The switch is open during non-operative periods, but by closing the switch all branch circuits of the machine may be charged by the aforesaid wires 309, 310.

In the drawing several switchboards, 330, 340, 350, 360, 370, and 380 are illustrated. The object of providing several switchboards is to have an individual switchboard for each mechanism of the machine in order to facilitate the stringing of the connection wires between the different mechanism. Some of these mechanisms are detachably fastened to each other, as for instance the counting device and the mechanism for the justification both fastened to the character keyboard. Permanent wire connections between any two of these mechanisms without intermediate switchboards would complicate the wiring and also render the machine impracticable on account of the difficulties connected with the repair, inspection and detaching of members.

*Character keyboard.*

The keyboard frame 318 illustrated diagrammatically in two separate sections is provided with a number of free returning push contacts or keys, namely, a plurality of character keys, (of which only one key, 319, is shown) and one key each for the space, line cancel and the so-called zero justification 320, 321, and 322, respectively, the last one to be operated only when a set line does not require justification.

The keyboard frame is connected with the branch inlet wire 323 over a contact pin "KB" 324 coming from another contact pin marked "KB CCM FD JKB", which is connected with the pivoted armature 315 of the relay magnet 314. The stationary member of the relay point 316 is connected by a wire 311 with a contact pin marked "IN 313", the latter one permanently charged by the main inlet wire 309.

A so-called sparker 325, diagrammatically shown separated from the different keys previously mentioned, is in such relationship to each key that the depression of any key automatically effects a contact of the two sparker points, thereby closing a circuit leading over the main inlet wire 309 to a contact pin marked "IN" upon the multiple keyboard switch 330 thence over the wire 329 to the general keyboard inlet marked "IN-LET" and over the wire 328 to one contact point of the aforesaid sparker 325. The other contact of the sparker is connected by a wire 327 with the relay magnet contact pin "RM" 326 thence by a wire 331 with the relay magnet contact pin "RM" 332 upon the relay magnet supporting base (not shown in the drawing) and by the wire 333 with one terminal of the relay magnet. The other terminal of the relay magnet is connected with a second relay magnet contact pin "RM" 334 upon the aforesaid relay magnet supporting base by a wire 335, which leads into the main outlet wire 310 after passing through a resistance of 2200 ohms. The depressing of any key mounted upon the character keyboard frame effects automatically the closing of the contact points of the sparker 325, as previously mentioned, thereby closing the relay magnet circuit and also effecting through the actuated relay magnet armature 315 the contacting of the relay points, whereby electrical connection is established between the main inlet wire and the keyboard frame, the latter one being only charged during the contacts of the relay points.

The object of the sparker 325 is to make and break the circuit at the sparker point in order to avoid the burning of the key contact points, 337, 338.

Accordingly the parts are arranged in such a manner that at the depression of any key the respective key contact is effected before the contacting of the sparker points; and at the release the circuit is broken at the sparker points before the key contacts are broken. No current passes through the circuits at the time of the make and break of the key contacts and consequently no sparking at or burning of these contacts takes place.

The relay magnet is provided with a condenser 317 in a familiar manner.

*Character key and counting mechanism circuits.*

The selectors are provided each with a center collar and two side collars, one on each side of the center collar, which is not actuated by depressing a character key. But each side collar slidably mounted upon the selector may be set in 15 different positions, corresponding with 15 row columns and 15 individual columns in the matrix, the left side collar being for the individuals, the right one for the rows. See also Figs. 29, 30, 31. The side collar for the individuals may be pushed from a normal to an extreme position by a resiliently mounted lever operated by the so-called "individual king" magnet and the side collar for the row column may be operated by a similar lever actuated by the so-called "row king" magnet. These magnets are disposed in pairs and are marked in Fig. 32 "individual king" and "row king" (see also Figs. 29, 30).

There are also 28 operable stops provided, which may be brought into the path of the aforesaid two collar setting levers, (Fig. 29) these stops being actuated by stop magnets 207, 217. If none of these stop magnets be excited the "individual king" and "row king" magnet actuating the setting levers push the side collars to dead stops, which correspond for the individual side collar with the 15th individual column and for the row side collar with the 15th row column in the matrix. Besides these two dead stops (not indicated in the drawing) 14 operable stops each (28 *in toto*) previously referred to, for the corresponding individual columns and row columns are provided. The circuits connecting the individual and row stop magnets are as follows:

Each stop magnet is connected with the respective character key. The character key 319 shown in the drawing is connected with the individual stop magnet No. 8 and by a second circuit with the row stop magnet No. 2 corresponding with the 8th individual column and the second row column, respectively, in the matrix. These two mentioned circuits will be closed by depressing the character key 319 by means of two downwardly extending contact pins, 337 and 338, and contact terminals registering therewith in a plate 339 of insulating material in the character keyboard. The wire 340 for the row stop magnet connects one of these contact terminals with a contact pin 341 in one of 15 groups of 30 contact pins each, disposed upon the interchangeable switchboard 330. Each group of 30 pins may be for explanatory reasons conveniently subdivided in two groups of 15 pins for the individuals and 15 for the rows. In Fig. 32 only one group of 30 pins is shown, but in Fig. 4 all 15 groups are illustrated. Each of the 30 pins in the group is in contact with one of 30 parallel plates (not shown in Fig. 32) separated from each other by suitable insulating material, or in other words, in each group is one pin (15 *in toto*) permanently contacting with one of the 30 plates. The contact is effected by forcing the pin into the respective plate and no contact between this pin and the other 29 plates is assured by passing the pin through conveniently large holes in these plates. One pin and three plates are diagrammatically illustrated in Fig. 3 (see also Fig. 2). For explanatory reasons the aforesaid 30 plates may be also subdivided into two groups of 15 each, one group for the individuals, the other one for the rows. The plate for the 15th individual and the plate for the 15th row are not connected with any of these latter mentioned pins, but are directly connected with the individual king magnet and the row king magnet, respectively, because the setting levers for the collars have to be operated to the dead stops, which do not require operation of any row stop or individual stop and consequently no exciting of any row stop magnet and individual stop magnet. The circuits connecting these 15th plates with the king magnets are however not shown in Fig. 32.

In this particular instance the respective plate diagrammatically illustrated in the drawing by the circuit line 342 bridges the current from the contact pin 341 to the switch contact 2 for the rows marked "R" upon the switchboard 330. The current then flows to the corresponding inlet contact pin on the intermediate switchboard 350, No. 2 in this instance, thence to the corresponding inlet contact pin 2 on another intermediate switchboard 360, and from there to one terminal of the row stop magnet No. 2. Passing through the magnet coils the circuit connects with the corresponding outlet contact pin on the switchboard 360, #2 in this case thence with the contact pin 2 on the switchboard 350 and with the row contact pin 2 on the switchboard 370 of the counting mechanism. The characters in the matrix are disposed so that equal units appear in one row. In this instance 8 is the unit value for all characters in row 2. Accordingly a permanent wire connection leads from the row pin 2 on switchboard 370 to the unit contact pin 8 upon the same switchboard therefrom to the corresponding unit contact pin 8 upon the switchboard 380 for the unit magnets and thence to one terminal of the corresponding unit magnet 8. The current flows from the unit magnets in a common return circuit over the row king as follows: From the unit magnets to a unit return contact pins marked "UR" on switchboards 380 and 370 to unit return contact marked "RK" on switchboard 350, thence to row king contact screw marked "RK" on switchboard 360, from there to and through the row king magnet coils, returning to the king return contact screw marked "KR" in switchboard 360, and from there to the common return contact screw marked "CR" on the same switchboard, then to the common return contact pin marked "CR" in switchboard 350 and from there through a wire 351 to the main outlet wire 310.

In order to operate the hands upon the dial of the counting mechanism, it is necessary to excite the respective magnet marked "CCM," which is accomplished over a switchboard 430 and by a circuit 431 branching from the relay point circuit 323 and returning over respective contact pins marked "CR" upon switchboards 430 and 370 into the common return wire 310.

Circuit for the individuals.

Similar circuits connect the character keys with the respective stop magnets for the individual side flange setting lever, these circuits, however, avoiding the unit counting mechanism. The counting is accomplished by the circuits for the rows, as previously specified. The circuits for the individual stop magnets may be traced as follows: from the character key to the corresponding individual contact pins No. 8, in the present instance, upon switchboards 330, 350 and 360, thence to and through individual stop magnet No. 8 back to individual return marked "IR" upon keyboard 360, thence to and through individual king magnet and back to the common return by using partly the return wire of the row king magnet.

Each individual stop magnet and its corresponding "king" magnet are thus operatively connected for the reason that they together set the selector collars, the king magnet actuating and the stop magnet limiting the throw of the collar setting levers operated by the former.

Feed.

A branch circuit 361 connects the inlet wire 323 with the feed contact pins marked "FD" upon the switchboards 350, 360. Connection is made from the latter keyboard by wire 372 with the feed magnets 362, the return leading to the common return contact marked "CR" upon switchboards 360 and 350, and thence over wires previously specified, to the common switch outlet 307.

Space circuits.

After the composing of each word, the space key has to be depressed with the object of automatically recording the number of spaces between the words in a line of given units. By each depression of the space key the justification mechanism lifts the plates 200 one step by means of a ratchet wheel and pawl actuated by the magnet 406, more clearly described in another part of this specification. One branch of the circuit for this space begins at the space key contact following the wire 358 to individual 8 on keyboard 330 and thence follows wires previously described to the individual stop magnet #8 and individual king magnet returning over the described return wires. The other branch of the space circuit follows the wire 359 leading to the inlet contact pins marked "SP" on keyboards 330 and 340 and is connected with the coils of the magnet 406, returning to the outlet contact pins upon keyboards 340 and 330, thence over two contact pins upon keyboard 370 marked "U4," to the counting mechanism over the 4 unit magnet in order to register upon the counting dial the four units of a normal space. The returning circuit previously specified in connection with the circuits of the unit magnets excites the row king magnets but none of the row stop magnets, effecting thereby the actuation of the row side flange setting lever to its extreme position, which is equivalent to the shifting of the matrix to the 15th row. It has been stated that the circuit for the space excites the individual stop magnet #8, equivalent to the 8th individual column in the matrix and also shifts the matrix to the dead stop, equivalent to the 15th row column in the matrix. The space key therefore represents in a certain sense a key for a character, which is located in the matrix at the point of intersection between the 8th individual column and the 15th row column.

Zero justification.

If a composed line has the given number of units, no space justification will be required. In this case the so-called zero justification key has to be depressed at the end of the line in order to perform by the circuits connected therewith the required operations. The circuit for the zero justification leads from the keyboard frame and the zero justification key upon this keyboard over a wire 356 to the individual contact pin 10, upon switchboard 330, which is connected with the corresponding knife switch contact pin 161 of the guillotine, or drop head 160 referred to in another part of this specification.

It has been stated that the justifying mechanism brings step by step another plate 200 into position to be drawn under the contact pins of the drop-head 160. When the drop-head 160 is depressed the respective contact pin will penetrate the respective perforation in the drawn out justifier plate and the current then circulates from the guillotine pin through the justifier frame to a contact 411 of the sector switch. The other contact 412 is connected with the relay point over the respective contact pin marked "RP" on switchboard 340 connecting by a wire 341 with the inlet wire 323 previously referred to.

It will be understood that the zero justification requires the depression of two keys, namely, first the zero justification key and second the depression of a key (not shown in Fig. 32) which actuates the sector lever 410 in the direction for justification and simultaneously first draws the respective justifier plate into position and second actuates the magnet 165 which depresses the guillotine, or drop-head 160. The three contact points of the circuit considered, viz. at the zero justification key, the guillotine pin and the sector which normally are not contacting are then contacting, establishing thereby a closed circuit.

In the diagrammatical drawing 32, a plan 390 is shown representing all contact pins in the guillotine, which comprises one pin for the shift and a plurality of pins for the individuals and rows. The guillotine is also represented in Fig. 32 by a diagram 390, but only the contact pin for the shift and one contact pin 161 each for the rows and individuals is represented with its circuit layout in this detail.

Trip.

It is necessary to accomplish at the end of each line the so-called trip in order to set off the individual side collar into its extreme left or 15th position. This position being decided by a dead stop, it is consequently not necessary to excite an individual stop magnet, but in order to actuate the individual collar setting lever the individual king magnet has to be excited. This is accomplished by closing the respective circuit at the switch terminals formed at 12 and 13 by means of a contacting bridge 416, which being part of the sector 185—represented diagrammatically in Fig. 32 is automatically brought into the contacting position when the sector 185 is operated. The sector is mechanically actuated by connections set in motion by justifier key lever 145 previously referred to but not shown in Fig. 32, and it should be borne in mind that the depression of this key lever actuates the sector first in the direction for the trip and second in the opposite direction for the justification, closing first the circuit for the trip and then the circuit for the justification.

The trip circuit has been traced previously up to the terminal 412, which is common to the trip and the zero justification. The other branch of the trip circuit starts at the terminal 413 leading over a wire 422 to the respective contact pins marked "IK" upon the switchboards 340, 330, 350, 360, to and through the individual king magnet, returning upon the common return wires previously specified. It will be seen that the wires terminating in 411, 412, 413 are not charged during non-contact of the relay point, because the wire terminating in 412 is connected with the normally non-contacting relay point. Ordinarily the relay point is contacting when a key upon the character keyboard is depressed. But the keys upon the general keyboard not being actuated during the depression of the trip key or in other words the relay point not being closed other means must be provided to close the relay point when the key for the trip is depressed in order to energize the circuits for the trip and the justification. This is accomplished by a circuit 423 branching from the inlet wire 329 and leading to the switch terminal 414 which may be brought into contact with the other switch terminal 415 by a contact bridge 417 upon the sector 185 operated mechanically when the trip key is depressed. The other branch of the circuit 423 starts at the switch terminal 415 and leads over respective contact pins marked "RM" upon the switchboard 340 to the relay magnet circuit. Hence when the trip or justification circuits are closed the relay point is simultaneously closed, effecting the energizing of all circuits considered.

*Shift.*

The circuit for the shift will be closed by the shift contact pin marked "SH" upon the guillotine 160 when the guillotine is depressed. One branch of this circuit starts at the knife switch terminal below the guillotine and follows a wire 403 leading over switch contact pins marked "SH" upon the switchboards 340, 350, 360 to and through the shift magnet. The returning branch of the shift starts at the outlet terminal of the shift magnet leading over common return contact pins to the general common return wire.

*Justification.*

The circuits for the shift and individuals terminating in the justification mechanism have been described above. It has been also described how the guillotine frame and the justifier frame is energized. It remains to trace the row circuits terminating in the justification mechanism. In the present instance the row circuit starts at the respective knife switch terminal below the guillotine marked "R" leading to the respective row contact pin (2 in the present instance) upon the switchboard 330, to circuit wires previously described.

When justifying (or shifting) it is also necessary to excite the magnet 165 in order to depress the drop-head 160 suitably connected therewith. This is effected by a circuit leading from the guillotine frame 160$^a$ of the cross-head to and through the magnets 165 and then upon an outlet wire to the general outlet wire 310.

The collars on the selectors are returned to a normal position as shown in Fig. 31 by means of two oppositely disposed levers 226 having finger ends 226$^a$ which are operated simultaneously so that their points are carried from the position shown in said figure to the positions shown in dotted lines thereof, carrying the collars 221 and 222 against the central collar 223, as indicated, in which normal position the selector is prepared for a re-setting. The selector shaft 220 is shown supported in the channel for selectors, the walls of which are seen at 225. The fingers are adapted to be operated simultaneously in opposite directions by the very simple device of having a tongued arm 227 projecting from one of the levers into a grooved arm 228, extending laterally from the hub of the other lever 226 and receiving the rounded end of the lever 227 so that when one of said levers is oscillated upon its pivotal bearing, the other lever will move simultaneously therewith. Any convenient means for swinging the said levers upon their respective pivots may be employed; in the present instance the acting bell lever 229 is employed suitably supported immediately above the levers upon the framework supporting the channels 225, one arm of which lever 229 is operably connected with a connecting rod 229$^a$ which may be connected in any convenient way with the driving mechanism of the composing machine to reciprocate vertically to the extent desired at each revolution of the driving shaft thereof.

Having described our invention, what we claim is:

1. In a type casting and composing machine, means for controlling the set value of type cast and composed thereon, and means for registering the unit values thereof; justifying means for setting said controller means in accordance with the indications of said registering means to cast spaces therefor, said justifying means comprising a switchboard layout and a plurality of spring contacts thereon; a traveling device having longitudinal yielding pins adapted to engage corresponding contacts of said switchboard; means for alternately raising and lowering said traveling device to make and break possible electrical connections between said pins and said contacts; and means for predetermining the number and location of contacts to be made therebetween.

2. In a type casting and composing machine, means for controlling the set value of type cast and composed thereon, and means for registering the unit values thereof; justifying means for setting said controller means in accordance with the indications of said registering means to cast justifying spaces therefor, said justifying means comprising a switchboard layout and a plurality of spring contacts thereon; a traveling member having longitudinal yielding pins adapted to engage corresponding contacts of said switchboard; means for alternately raising and lowering said traveling device to make and break possible electrical connections between said pins and said contacts; and means for predetermining the number of contacts to be made therebetween, said predetermining means comprising a series of plates having perforations thereon and means for introducing any one of said plates between said traveling member and said switchboard.

3. In a type casting and composing machine, means for controlling the set value of type cast and composed thereon, and means for registering the unit values thereof; justifying means for setting said controller means in accordance with the indications of said registering means to cast justifying spaces therefor, said justifying means comprising a switchboard layout and a plurality of spring contacts thereon; a traveling member having longitudinal yielding pins adapted to engage corresponding contacts of said switchboard; means for alternately raising and lowering said traveling device to make and break possible electrical connections between said pins and said contacts; means for predetermining the number of contacts to be made therebetween, said predetermining means comprising a series of plates, having perforations thereon, each plate thereof relating to a different number of justifying space insertions, said perforations corresponding to the location of contacts in said switch, and means for introducing any one of said plates between said traveling member and said switchboard.

4. In a type casting and composing machine, means for controlling the set value of type cast and composed thereon, and means for registering the unit values thereof; justifying means for setting said controller means in accordance with the indications of said registering means to cast justifying spaces therefor, said justifying means comprising a switchboard layout and a plurality of spring contacts thereon; a traveling member having longitudinal yielding pins adapted to engage corresponding contacts of said switchboard; means for alternately raising and lowering said traveling device to make and break possible electrical connections between said pins and said contacts; means for predetermining the number of contacts to be made therebetween, said predetermining means comprising a series of plates having perforations thereon, each plate thereof relating to a different number of justifying space insertions, said perforations corresponding to the location of contacts in said switch; means for introducing any one of said plates between said traveling member and said switchboard, said perforations being arranged in combinations at different positions on said plates arranged longitudinally thereof with reference to the unit justification as indicated on said registering means, said combinations having been predetermined in accordance with the justification to which the particular plate upon which they are located relates.

5. In a type casting and composing machine, means for controlling the set value of type cast and composed thereon and means for registering the unit value thereof; justifying means for setting said controller means in accordance with the indications of said registering means to cast justifying spaces therefor, said justifying means comprising a plurality of electric contacts; a traveling member having a plurality of yielding pins adapted to make and break connection with said contacts as said member is alternately raised and lowered; means for predetermining the contacts to be made thereby, said predetermining means comprising a series of plates and means for variously locating any one of said plates relative to said contacts in accordance with the units indicated by said registering device, said locating means comprising stops and justifier keys corresponding with and adapted to operate said stops, said stops being located between said traveling member and said contacts; and means comprising magnets controlled by said keys for locating said plates in accordance with the markings on said registering means.

6. In a type casting and composing machine, means for controlling the set value of type cast and composed thereon and means for registering the unit value thereof; justifying means for setting said controller means in accordance with the indications of said registering means to cast justifying spaces, said justifying means comprising a plurality of electric contacts; means for making and breaking electric connection with said contacts and for predetermining the number of contacts to be made thereby, said predetermining means comprising a series of plates, each of said plates relating to a given number of spaces in lines to be justified; means for advancing any one of said plates relative to said contacts in accordance with the units indicated by said registering device, and means comprising a space key for selecting plates for said advancing means in accordance with the number of spaces to be inserted in said justified line.

In testimony whereof, we have hereunto set our hands in the presence of two subscribing witnesses.

WILLIAM NICHOLAS.
WILLIAM ACKERMAN.

Witnesses:
EDITH ENNISSON,
JAMES ENNISSON.